(12) United States Patent
Yamaoka et al.

(10) Patent No.: US 12,066,075 B2
(45) Date of Patent: Aug. 20, 2024

(54) SHOCK ABSORBER

(71) Applicant: HITACHI ASTEMO, LTD., Ibaraki (JP)

(72) Inventors: Fumiyuki Yamaoka, Ibaraki (JP); Joji Endo, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 526 days.

(21) Appl. No.: 17/417,463

(22) PCT Filed: Dec. 20, 2019

(86) PCT No.: PCT/JP2019/050112
§ 371 (c)(1),
(2) Date: Jun. 23, 2021

(87) PCT Pub. No.: WO2020/137891
PCT Pub. Date: Jul. 2, 2020

(65) Prior Publication Data
US 2022/0065321 A1    Mar. 3, 2022

(30) Foreign Application Priority Data

Dec. 25, 2018 (JP) ................................. 2018-241324

(51) Int. Cl.
*F16F 9/18* (2006.01)
*B60G 13/08* (2006.01)
(Continued)

(52) U.S. Cl.
CPC .................. *F16F 9/18* (2013.01); *F16F 9/34* (2013.01); *F16F 9/348* (2013.01); *F16F 9/516* (2013.01);
(Continued)

(58) Field of Classification Search
CPC ...... F16F 9/18; F16F 9/34; F16F 9/348; F16F 9/465; F16F 9/516; F16F 9/3484;
(Continued)

(56) References Cited

U.S. PATENT DOCUMENTS 5,368,142 A * 11/1994 Ashiba ..................... F16F 9/468
188/266.5
2002/0000352 A1* 1/2002 Matsumoto ........... F16F 9/3484
188/282.1
(Continued)

FOREIGN PATENT DOCUMENTS

DE    102010063897 A1    6/2011
DE    102012210685 A1    1/2014
(Continued)

OTHER PUBLICATIONS

German Office Aciton of German counterpart of this application issued on May 16, 2023 and English translation thereof (11 pages).
(Continued)

*Primary Examiner* — Robert A. Siconolfi
*Assistant Examiner* — San M Aung
(74) *Attorney, Agent, or Firm* — Venjuris, P.C.

(57) ABSTRACT

A shock absorber includes: a cylinder; a piston slidably inserted into the cylinder; a piston rod connected to the piston and extending outside the cylinder; a main valve that generates a damping force; a pilot chamber that applies pressure to the main valve; an introduction passage that introduces the fluid into the pilot chamber; a pilot passage that communicates the pilot chamber and a downstream side of the main valve with each other; and a control valve provided in the pilot passage. In an upstream side of the pilot passage from the control valve, the pilot passage is provided with a first orifice, a first passage provided in parallel with the first orifice, a first check valve that is opened at a
(Continued)

predetermined differential pressure and allows a flow toward the control valve through the first passage, and a second orifice.

11 Claims, 23 Drawing Sheets

(51) Int. Cl.
  *B60G 17/08* (2006.01)
  *F16F 9/34* (2006.01)
  *F16F 9/348* (2006.01)
  *F16F 9/516* (2006.01)
(52) U.S. Cl.
  CPC .............. *B60G 13/08* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2500/114* (2013.01); *B60G 2600/182* (2013.01); *B60G 2600/21* (2013.01); *B60G 2800/162* (2013.01); *B60G 2800/916* (2013.01); *F16F 2222/12* (2013.01); *F16F 2228/066* (2013.01); *F16F 2230/183* (2013.01); *F16F 2232/08* (2013.01); *F16F 2234/02* (2013.01)
(58) Field of Classification Search
  CPC ............... F16F 2222/12; F16F 2232/08; F16F 2234/02; B60G 13/08; B60G 17/08; B60G 2202/24; B60G 2204/62; B60G 2206/41; B60G 2500/104; B60G 2500/114; B60G 260/21; B60G 260/182; B60G 2800/162; B60G 2800/916
  USPC ...................................................... 188/282.1
  See application file for complete search history.

(56) References Cited

U.S. PATENT DOCUMENTS

| 2013/0341540 A1* | 12/2013 | Manger | F16F 9/46 |
| | | | 251/30.01 |
| 2016/0236533 A1* | 8/2016 | Inagaki | F16F 9/46 |
| 2017/0328440 A1* | 11/2017 | Sakuta | F16F 9/464 |

FOREIGN PATENT DOCUMENTS

| DE | 102014205410 A1 | 12/2014 |
| DE | 102015218292 A1 | 4/2017 |
| JP | H09-242805 A | 9/1997 |
| JP | 2014-173715 A | 9/2014 |
| JP | 2016-032990 A | 3/2016 |
| WO | 2017/145983 A1 | 8/2017 |

OTHER PUBLICATIONS

International Search Report issued on Mar. 17, 2020 for WO 2020/137891 A1 (4 pages).

\* cited by examiner

SHOCK ABSORBER

CROSS REFERENCE TO RELATED APPLICATIONS

This application is a national phase of PCT application No. PCT/JP2019/050112, filed on 20 Dec. 2019, which claims priority from Japanese patent application No. 2018-241324, filed on 25 Dec. 2018, all of which are incorporated herein by reference.

TECHNICAL FIELD

The present disclosure relates to a shock absorber of a damping force adjusting type that adjusts a damping force by controlling the flow of a working fluid with respect to a stroke of a piston rod.

BACKGROUND

Patent Document 1 discloses a damping valve that reduces the change in a damping force before and after opening a main valve in a hard side damping force characteristic by opening the main valve in two stages. The damping valve may reduce the valve vibration when the main valve is opened, and may improve the sound vibration performance of the shock absorber.

PRIOR ART DOCUMENT

Patent Document

Patent Document 1: Japanese Laid-Open Patent Publication No. 2014-173715

SUMMARY OF THE INVENTION

Problem to be Solved

In the above described damping valve, the port of the main valve is opened in two stages, which causes complexity of the structure. Further, since a flow path area of an orifice that generates back pressure (pressure in a pilot chamber) of the main valve is constant, it is difficult to reduce a soft side damping force characteristic, and thus, it is difficult to further improve the riding comfort of a vehicle.

The present disclosure is to provide a shock absorber capable of further improving the riding comfort of a vehicle.

Means to Solve the Problem

A shock absorber according to the present disclosure includes: a cylinder filled with a fluid; a piston slidably inserted into the cylinder; a piston rod connected to the piston and extending outside the cylinder; a main valve configured to control a flow of the fluid generated by sliding of the piston in the cylinder, thereby generating a damping force; a pilot chamber configured to apply pressure to the main valve in a valve closing direction; an introduction passage configured to introduce the fluid into the pilot chamber; a pilot passage configured to communicate the pilot chamber and a downstream side of the main valve with each other; and a control valve provided in the pilot passage. In an upstream side of the pilot passage from the control valve, the pilot passage is provided with a first orifice that always communicates, a first passage provided in parallel with the first orifice, a first check valve that is opened at a predetermined differential pressure and allows a flow toward the control valve through the first passage, and a second orifice.

Effect of the Invention

According to the present disclosure, the riding comfort of a vehicle may further be improved.

DETAILED DESCRIPTION TO EXECUTE THE INVENTION

First Embodiment

A first embodiment of the present disclosure will be described with reference to accompanying drawings. For convenience, the vertical direction in FIG. 1 is referred to as a "vertical direction."

Figure 1:
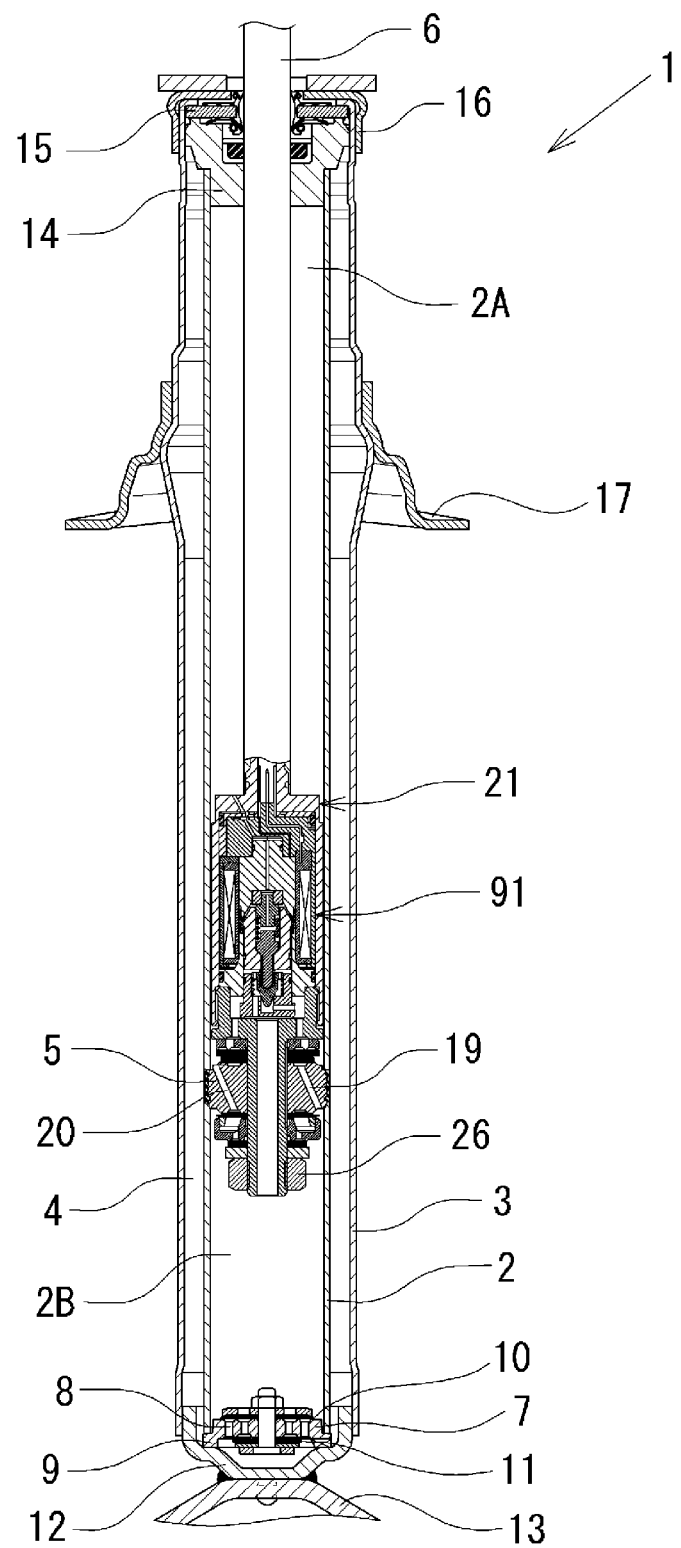
FIG. 1 is a cross-sectional view taken along a uniaxial plane of a shock absorber according to a first embodiment.

Referring to FIG. 1, a shock absorber 1 according to the first embodiment is a so-called a piston built-in type damping force adjusting shock absorber 1 (hereinafter, referred to as a "shock absorber 1"), in which a damping force generating mechanism 31 including a solenoid 91 is built in a piston case 21 (piston) in a cylinder 2. The shock absorber 1 has a double tube structure provided with an outer tube 3 outside the cylinder 2, and a reservoir 4 is formed between the cylinder 2 and the outer tube 3. A piston valve 5 (piston) is slidably inserted into the cylinder 2. The piston valve 5 is provided with a piston band 5A on the outer peripheral side, and partitions the inside of the cylinder 2 into two chambers, that is, a cylinder upper chamber 2A and a cylinder lower chamber 2B. The piston valve 5 includes an extension side passage 19 with an upper end opened to the cylinder upper chamber 2A and a contraction side passage 20 with a lower end opened to the cylinder lower chamber 2B.

A base valve 7 is provided in a lower end portion of the cylinder 2 to partition the cylinder lower chamber 2B and the reservoir 4 from each other. Passages 8 and 9 are provided in the base valve 7 to communicate the cylinder lower chamber 2B and the reservoir 4 with each other. The passage 8 is provided with a check valve 10 that allows distribution of an oil liquid (working fluid) from the reservoir 4 side to the cylinder lower chamber 2B side. The passage 9 is provided with a disc valve 11 that is opened when the pressure of the oil liquid on the cylinder lower chamber 2B side reaches a set pressure, and releases the pressure (oil liquid) on the cylinder lower chamber 2B side to the reservoir 4 side. As the working fluid, an oil liquid is filled in the cylinder 2, and an oil liquid and a gas are filled in the reservoir 4. Further, a lower cap 12 is joined to a lower end of the outer tube 3, and a mounting member 13 is joined to the lower cap 12.

Figure 2:
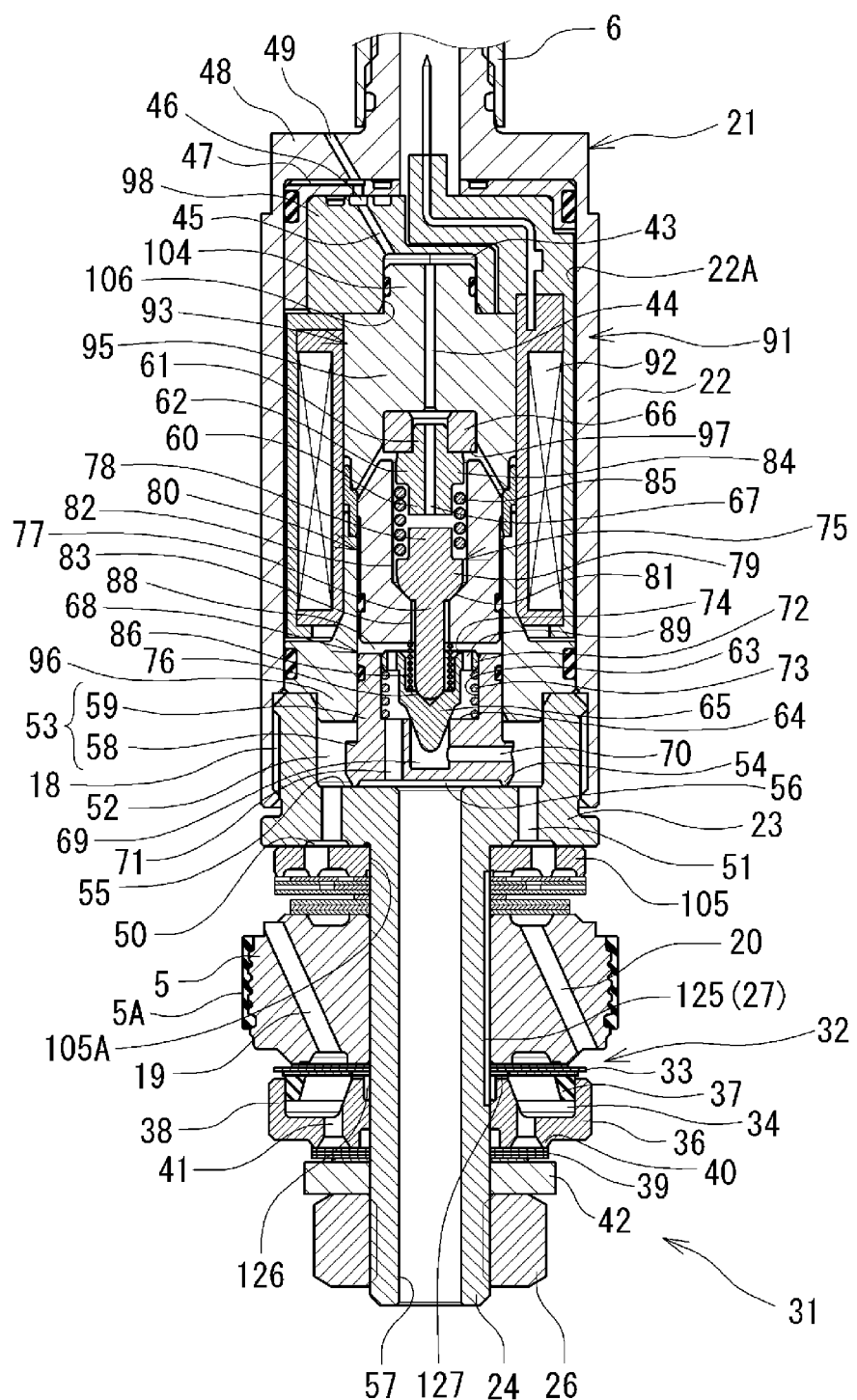
FIG. 2 is an enlarged view illustrating a main part in FIG. 1.

As illustrated in FIG. 2, the piston valve 5 is connected to the piston rod 6 via the piston case 21. The piston case 21 includes a substantially cylindrical shape case body 22 connected to a lower end portion (one end) of the piston rod 6, a case bottom portion 23 that closes a lower end of the case body 22, and a shaft portion 24 extending in the axial direction (downward) from a lower end of the case bottom portion 23 and to which the piston valve 5 is mounted. The case bottom portion 23 and the shaft portion 24 are one component, and the case body 22 and the case bottom portion 23 are integrated by a screw unit 18. As illustrated in FIG. 1, an upper end side (the other end side) of the piston rod 6 passes through the cylinder upper chamber 2A, and is inserted into a rod guide 14 mounted on the upper end portions of the cylinder 2 and the outer tube 3, and also into an oil seal 15 to extend to the outside of the cylinder 2. Further, the upper end portion of the outer tube 3 is covered with a cap 16, and a spring receiving member 17 is attached on an outer periphery of the outer tube 3.

As illustrated in FIG. 2, the shock absorber 1 includes a damping force generating mechanism 31 that generates a damping force by controlling a flow of the oil liquid between the cylinder upper chamber 2A and the cylinder lower chamber 2B generated by movement of the piston rod 6. The damping force generating mechanism 31 includes a main valve 32 provided in the lower end portion of the piston valve 5. The main valve 32 includes a damping valve 33 that generates a damping force by regulating the flow of the oil liquid from the cylinder upper chamber 2A to the cylinder lower chamber 2B when the piston valve 5 is moved to the extension side, a pilot chamber 34 that applies an internal pressure to the damping valve 33 in a valve closing direction, and an introduction passage 27 that introduces the oil liquid from the cylinder upper chamber 2A to the pilot chamber 34.

The damping valve 33 is configured by a disc valve, and has a shaft hole into which the shaft portion 24 of the piston case 21 is inserted. An inner peripheral edge portion of the damping valve 33 is sandwiched by an inner peripheral edge portion of the piston valve 5 and the inner peripheral edge portion of a pilot case 36. An annular packing 37 (seat portion) is provided on a lower surface of the damping valve 33. The packing 37 slidably abuts on an inner peripheral surface of an annular wall portion 38 of the pilot case 36. Therefore, the annular pilot chamber 34 is formed between the damping valve 33 and the pilot case 36. An outer peripheral edge portion of the damping valve 33 is seated on the lower end portion of the piston valve 5 so as to close an opening on the lower end side of the extension side passage 19 of the piston valve 5. Then, the cylinder upper chamber 2A and the cylinder lower chamber 2B are communicated with each other by a flow path formed by the extension side passage 19 and the valve opening of the damping valve 33.

The pilot case 36 includes a plurality of passages 41 that penetrates the pilot case 36 in the vertical direction. A disc valve 39 is provided in a lower end of the pilot case 36. In the disc valve 39, the shaft portion 24 of the piston case 21 is inserted into a shaft hole to close an opening on a lower end side of a passage 41 of the pilot case 36, and an outer peripheral edge portion thereof is seated on an annular seat portion 40 formed in the lower end portion of the pilot case 36. The disc valve 39 is opened when the pressure in the pilot chamber 34 reaches a set load. By opening the disc valve 39, the pressure (oil liquid) in the pilot chamber 34 is relieved to the cylinder lower chamber 2B. An inner peripheral edge portion of the disc valve 39 is sandwiched between the inner peripheral edge portion of the pilot case 36 and a washer 42.

As illustrated in FIG. 2, the case bottom portion 23 of the piston case 21 is provided with a plurality (only "two" are illustrated in FIG. 2) of passages 51 that penetrates the case bottom portion 23 in the axial direction (vertical direction). In the passage 51, a lower end is opened to an annular passage 50, and an upper end is opened to a chamber 52 formed inside an annular side wall of the case bottom portion 23. A valve seat 55 is formed on a bottom surface (bottom surface of the chamber 52) of the piston case 21, and an annular seat portion 54 formed in a lower end of a first valve body 53 is formed on the valve seat 55. By seating the seat portion 54 of the first valve body 53 on the valve seat 55, a first valve chamber 56 is formed between the first valve body 53 and the case bottom portion 23. The first valve chamber 56 is communicated with the cylinder lower chamber 2B via a passage 57 (shaft hole) formed in the shaft portion 24.

The first valve body 53 contains a non-magnetic material, and is formed in a stepped cylindrical shape having a large diameter portion 58 and a small diameter portion 59. The small diameter portion 59 of the first valve body 53 is slidably inserted to a lower portion of a magnetic portion 96 of a core 93 of the solenoid 91. A gap between the small diameter portion 59 of the first valve body 53 and the magnetic portion 96 of the core 93 is sealed with a sealing member. A bore 63 with an upper end opened is formed in the first valve body 53. A needle shape second valve body 65 is accommodated in the bore 63. The second valve body 65 is seated on a valve seat 64. The valve seat 64 is formed on an opening peripheral edge portion of a second valve chamber 69 that is opened to a bottom surface of the bore 63. The set load of the first valve body 53 and the second valve body 65 varies by adjusting a control current of the solenoid 91 with respect to a coil 92. A pilot valve 68 (control valve) is configured by the first valve body 53, the second valve body 65, and an actuator that varies the set load of the first valve body 53 and the second valve body 65 by thrust of the solenoid 91.

The first valve body 53 is formed with the second valve chamber 69 that is opened to a center of the bottom surface of the bore 63, a passage 70 that extends radially (left-right direction in FIG. 2) in the large diameter portion 58 and communicates the second valve chamber 69 and the chamber 52 with each other, and a passage 71 that communicates the second valve chamber 69 and the cylinder lower chamber 2B with each other when the second valve body 65 is opened. A flange portion 72 is formed in an outer peripheral edge portion on an upper end side of the second valve body 65. An outer peripheral surface of the flange portion 72 is slidably fitted into an inner peripheral surface of the bore 63. A compression coil spring 73 that urges the second valve body 65 upward with respect to the first valve body 53 is interposed between the flange portion 72 and the bottom surface of the bore 63. A recess 74 that is opened to a center of the upper end of the second valve body 65 is formed in the second valve body 65. An inner conical surface 76 that receives a hemispherical lower end of an actuating pin 75 is formed in a center of a bottom portion of the recess 74.

The actuating pin 75 includes a shaft portion 77 with the lower end received on the inner conical surface 76 of the second valve body 65, a base portion 79 with a lower half portion having a hemispherical shape, and a convex portion 78 formed in a center of an upper end of the base portion 79. In the actuating pin 75, the hemispherical surface of the base portion 79 is received by an inner conical surface 81 formed in a mover 80 of the solenoid 91. The inner conical surface 81 is connected to a lower end of a large diameter hole 82 that is opened to an upper end of the mover 80 and an upper end of a small diameter hole 83 that is opened to a lower end of the mover 80. The shaft portion 77 of the actuating pin 75 is inserted into the small diameter hole 83 of the mover 80. In the actuating pin 75, the hemispherical surface on the lower side of the base portion 79 is seated on the inner conical surface 81 of the mover 80 by urging force of a compression coil spring 85. The compression coil spring 85 is interposed between an outer peripheral edge portion of the base portion 79 and a spring receiving member 84.

The spring force of the compression coil spring 85 is transmitted to the first valve body 53 via the actuating pin 75 and the second valve body 65, and thus, the first valve body 53 is urged downward with respect to the core 93 of the solenoid 91. The spring receiving member 84 has a stepped shaft shape, and includes a large diameter shaft portion 60, a small diameter shaft portion 61, and a flange portion 62. The flange portion 62 is formed between the large diameter shaft portion 60 and the small diameter shaft portion 61, and receives an upper end of the compression coil spring 85. In the spring receiving member 84, the large diameter shaft portion 60 is inserted inside the upper end portion of the compression coil spring 85, and the small diameter shaft portion 61 is fitted into a spring 66 mounted in a recess 97 of a magnetic portion 95 of the core 93.

The second valve body 65 is urged downward with respect to the mover 80 by the spring force of a compression coil spring 86. The compression coil spring 86 is externally mounted on the shaft portion 77 of the actuating pin 75, and is interposed between the bottom surface of the recess 74 of the second valve body 65 and the mover 80. A space 88 inside the core 93 (magnetic portion 96) and also between the second valve body 65 and the mover 80 is communicated with the bore 63 of the first valve body 53 through a passage 89 formed in the flange portion 72 of the second valve body 65.

A coil cap 98 is fitted into an upper end portion of an inner peripheral surface 22A of the case body 22 of the piston case 21. The large diameter hole 82 inside the mover 80 is communicated with the cylinder upper chamber 2A via a shaft hole 67 of the spring receiving member 84, a shaft hole of the ring 66, a passage 44 that passes through the magnetic portion 95 in the axial direction, a space 43 between the coil cap 98 and the magnetic portion 95, passages 45 and 46 formed in the coil cap 98, a passage 47 formed between the coil cap 98 and a lid portion 48 of the case body 22, and a passage 49 formed in the lid portion 48 of the case body 22. Therefore, an air discharge passage is formed, which discharges air remaining in the piston case 21 during assembling.

Next, descriptions will be made on a pilot orifice unit 101 that generates a differential pressure that opens the main valve 32 between the pressure in the pilot chamber 34 and the valve opening pressure of the main valve 32.

Figure 3:
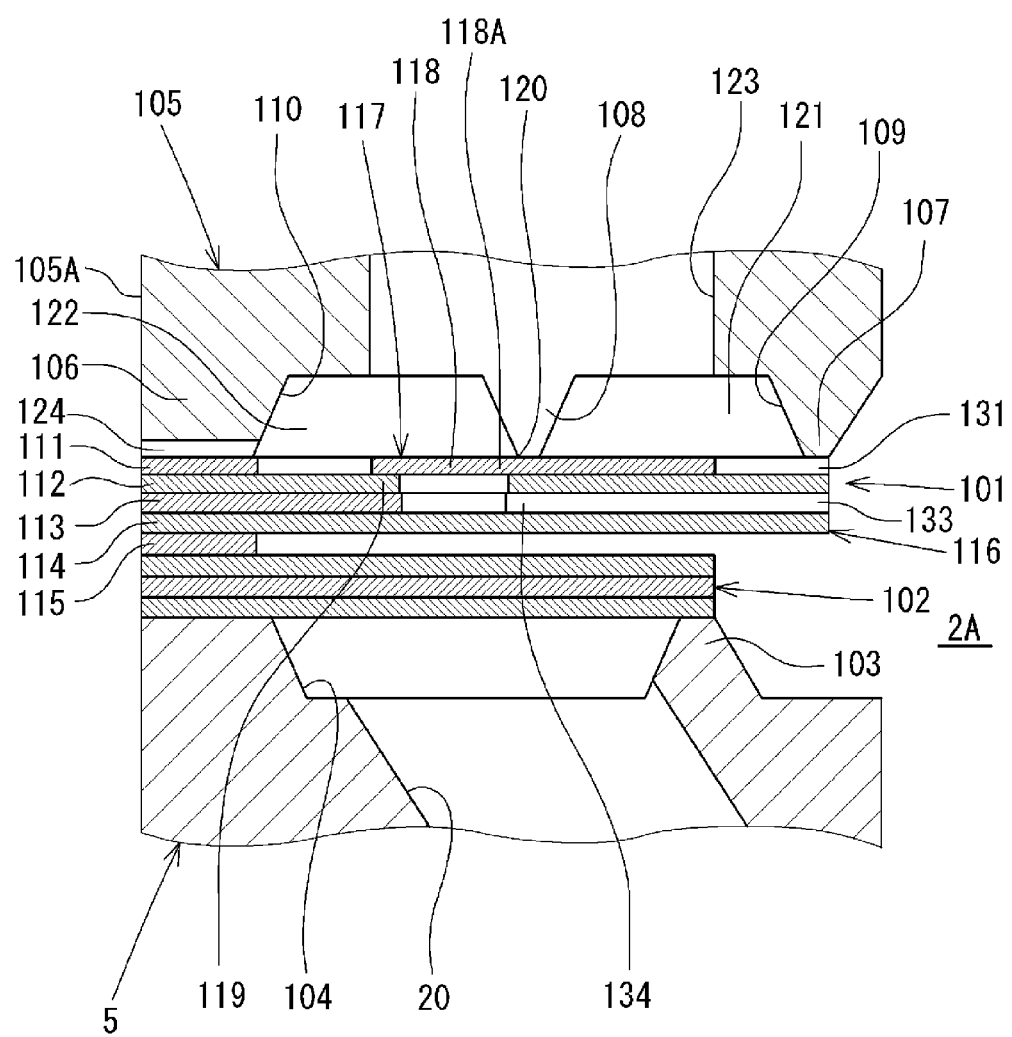
FIG. 3 is an explanatory view of a pilot orifice unit of the first embodiment.

As illustrated in FIGS. 2 and 3, a disc valve 102 is configured by stacking a plurality ("three" in the embodiment) of discs is provided on an upper end portion of the piston valve 5. An outer peripheral edge portion of the disc valve 102 is seated on an annular seat portion 103 formed on the upper end portion of the piston valve 5. In the upper end portion of the piston valve 5, an annular recess 104 is formed on an inside (inner peripheral side) of the annular seat portion 103. An upper end of the contraction side passage 20 is opened at the bottom portion of the annular recess 104.

The pilot orifice unit 101 includes an annular valve seat 105 with a shaft hole 105A into which the shaft portion 24 of the piston case 21 is inserted. An upper end surface of the valve seat 105 abuts on a lower end surface of the case bottom portion 23 of the piston case 21. A boss portion sandwiched between the inner peripheral edge portion of the piston valve 5 and the case bottom portion 23 of the piston case 21 is formed in an inner peripheral edge portion of the valve seat 105.

An annular seat portion 107 protruding downward is formed in an outer peripheral edge portion of the valve seat 105. An annular seat portion 108 protruding downward is formed in a lower end portion of the valve seat 105. The seat portion 108 is provided between the boss portion 106 and the seat portion 107. Annular recesses 109 and 110 are concentrically provided in the lower end portion of the valve seat 105. The outer annular recess 109 is formed between the seat portions 107 and 108. The inner annular recess 110 is formed between the seat portion 108 and the boss portion 106. An outer diameter (diameter) of the seat portion 107 is larger than an outer diameter of the seat portion 103 of the piston valve 5. Further, an outer diameter (diameter) of the seat portion 108 is smaller than the outer diameter of the seat portion 103 of the piston valve 5. In the embodiment, although it is illustrated that the outer diameter of the seat portion 108 is smaller than the outer diameter of the seat portion 103, the diameters may be equal to each other, or the relationship may be reversed.

As illustrated in FIG. 3, the pilot orifice unit 101 includes stacked circular discs 111 to 114. Outer diameters (diameters) of the discs 111 to 114 are the same with each other and larger than an outer diameter of the disc valve 102. The shaft portion 24 of the piston case 21 is inserted into shaft holes of the discs 111 to 114. Inner peripheral edge portions of the discs 111 to 114 are sandwiched between the boss portion 106 of the valve seat 105 and a retainer 115. The valve seat 105, the disc 111, the disc 112, the disc 113, the disc 114, the retainer 115, and the disc valve 102 are provided in the order from the upper side to the lower side between the case bottom portion 23 of the piston case 21 and the piston valve 5. Each component inserted through the shaft portion 24 of the piston case 21 is fixed to the case bottom portion 23 of the piston case 21 by an axial force generated by tightening a nut 26 mounted to a lower end portion of the shaft portion 24.

An outer peripheral edge portion of the disc 111 is seated on the annular seat portion 107 of the valve seat 105. The annular seat portion 108 of the valve seat 105 abuts on a base end portion 118A of a valve body 118 of a check valve 117 (to be described later), in other words, an annular area on the disc 111 at a certain distance from the center of the disc 111. Therefore, two annular passages 121 and 122 that are partitioned into an outer side and an inner side by the seat portion 108 are formed between the valve seat 105 and the disc 111. The annular passages 121 and 122 are communicated with each other through a plurality ("eight" in the embodiment) of passages 123 provided in the valve seat 105. The passages 123 are disposed on the seat portion 108 at equal intervals. An opening on an upper end side of the passage 123 is opened to the annular passage 50 formed in the case bottom portion 23 of the piston case 21.

A plurality ("four" in the embodiment) of passages 124 that communicates the shaft hole 105A of the valve seat 105 and the annular passage 122 with each other is formed in the boss portion 106 of the valve seat 105. The passages 124 are communicated with the pilot chamber 34 through an axial passage 125 (see FIG. 2) formed on the outer peripheral surface of the shaft portion 24 of the piston case 21, an annular passage 126 (see FIG. 2) formed in the shaft hole of the pilot case 36, and a radial passage 127 (see FIG. 2) formed on the upper end portion of the inner peripheral edge portion of the pilot case 36. A pilot passage 35 (see FIG. 4) that communicates the pilot chamber 34 and the cylinder lower chamber 2B that is the downstream side of the main valve 32 during the extension stroke with each other is configured by the radial passage 127, the annular passage 126, the axial passage 125, the passage 124, the annular passages 121 and 122, the passage 123, the annular passage 50, the passage 51, the chamber 52, the passage 70, the second valve chamber 69, the bore 63, the passage 71, the first valve chamber 56, and the passage 57.

Figure 4:
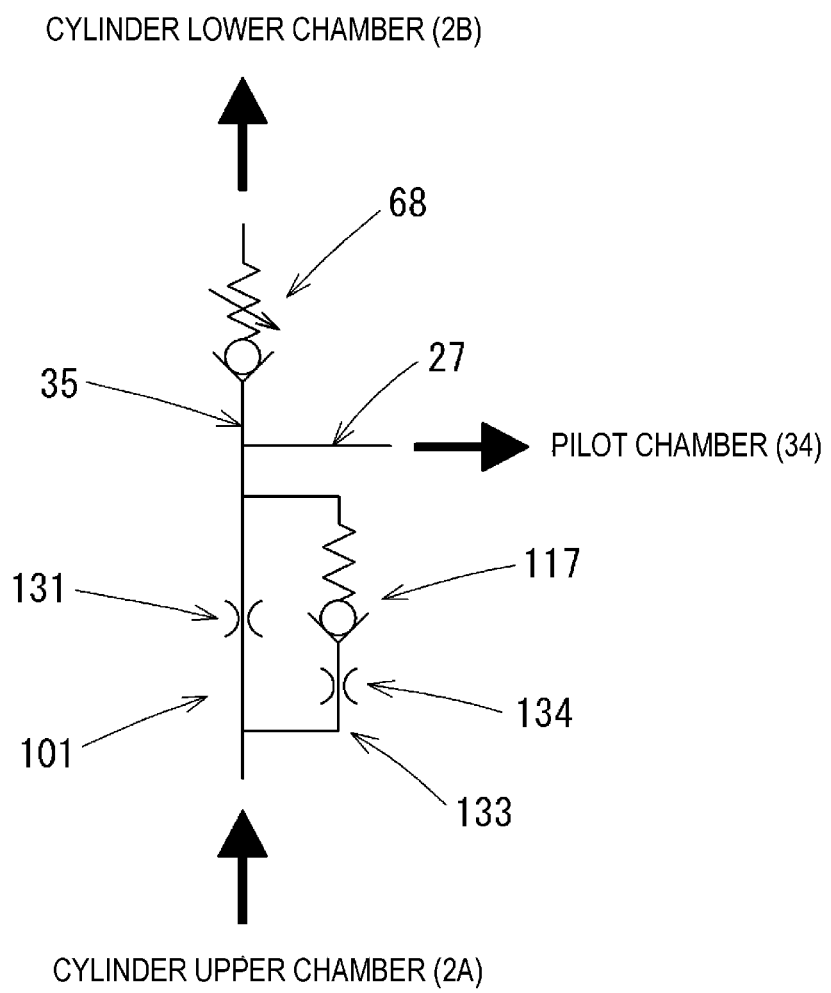
FIG. 4 is a conceptional view of the pilot orifice unit of the first embodiment.

Referring to FIGS. 3 and 4, the pilot orifice unit 101 is provided in the pilot passage 35 (to be described later) that communicates the cylinder upper chamber 2A and the cylinder lower chamber 2B with each other. The pilot orifice unit 101 includes a first orifice 131 that always communicates the pilot chamber 34 and the piston upper chamber 2A that is an upstream side of the main valve 32 (see FIG. 2) during the extension stroke (hereinafter "during the extension stroke") of the piston rod 6 with each other. The first orifice 131 is provided at a position that is an upstream side of the pilot valve 68 during the extension stroke. The first orifice 131 is provided between the seat portion 107 of the valve seat 105 and the disc 112 of the stacked discs 111 to 114, which is the second as counted from the top. The first orifice 131 is formed by a plurality ("four" in the embodiment) of slits 132 provided in the outer peripheral edge portion of the disc 111 of the stacked discs 111 to 114, which is the first as counted from the top.

The pilot orifice unit 101 includes a first passage 133 provided in parallel with the first orifice 131 on the upstream side of the pilot valve 68 during the extension stroke. The check valve 117 is provided in the first passage 133. The check valve 117 is opened when a differential pressure between the pilot chamber 34 and the piston upper chamber 2A that is the upstream side of the main valve 32 (see FIG. 2) reaches a predetermined differential pressure (hereinafter "valve opening differential pressure of the check valve 117"), in a hard side damping force characteristic of the extension stroke. By opening the check valve 117, the flow of the oil liquid from the piston upper chamber 2A that is the upstream side of the main valve 32 in the extension stroke to the pilot valve 68 through the first passage 133 is allowed.

Figure 5:
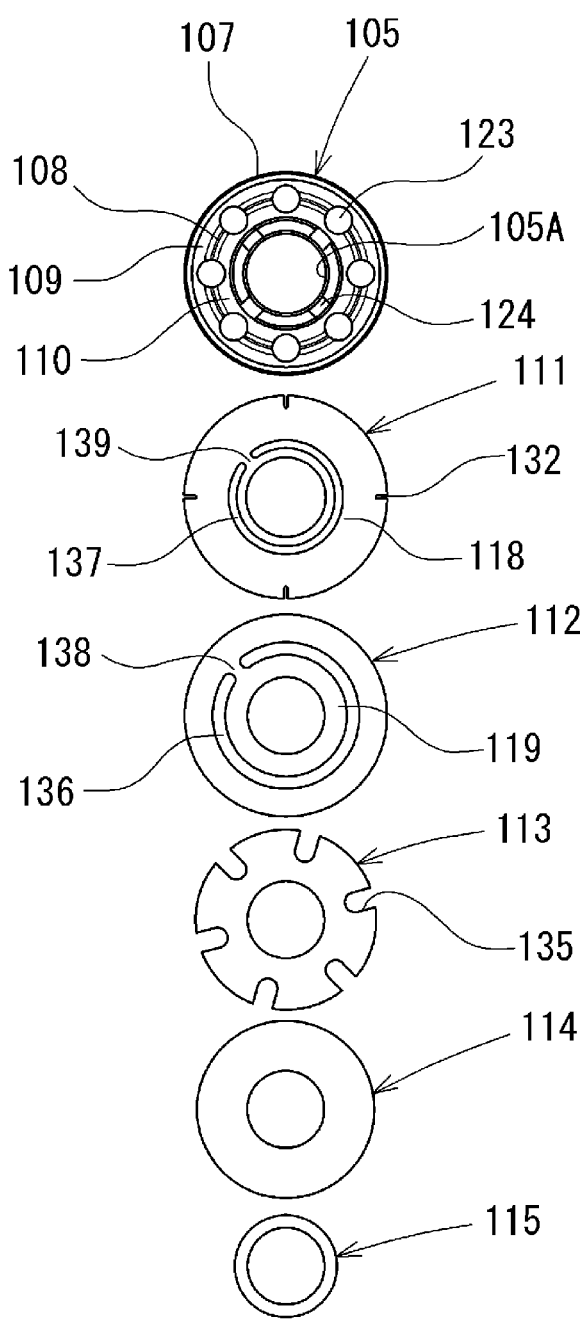
FIG. 5 is an exploded view of the pilot orifice unit of the first embodiment.

Referring to FIG. 5, the first passage 133 is formed by the disc 114 of the stacked discs 111 to 114, which is the fourth as counted from the top, a cutout portion 135 provided in the disc 113 that is the third as counted from the top, a cutout portion 136 provided in the disc 112 that is the second as counted from the top, and a cutout portion 137 provided in the disc 111 that is the first as counted from the top. The cutout portion 135 is a cutout extending radially (left-right direction in FIG. 3) from an outer circumferential end portion of the disc 113, and an inner tip portion is formed in a semicircular shape. The semicircular shape tip end portion of the cutout portion 135 is formed radially inside (left side in FIG. 3) of the seat portion 108 of the valve seat 105.

The cutout portion 136 is an annular cutout that is provided on the outside (outer periphery) of the shaft hole of the disc 112 and extends in the circumferential direction. In the disc 112, an annular portion outside the cutout portion 136 and an annular portion inside the cutout 136 in which the shaft hole is formed are connected by a connecting portion 138. The semicircular shape tip end portion of the cutout 135 of the disc 113 is opened to (communicated with) the cutout 136 of the disc 112 in a state where the discs 111 to 114 are stacked.

The cutout portion 137 is an annular cutout that is provided on the outside (outer periphery) of the shaft hole of the disc 111 and extends in the circumferential direction. In the disc 111, an annular portion outside the cutout portion 137 and an annular portion (a portion that abuts on the boss portion 106 of the valve seat 105) inside the cutout 137 in which the shaft hole is formed are connected by a connecting portion 139. An outer diameter of the cutout 137 of the disc 111 is smaller than an inner diameter of the cutout portion 136 of the disc 112. Therefore, an outer peripheral edge portion of the cutout 137 of the disc 111 and an inner peripheral edge portion of the cutout 136 of the disc 112 are overlapped with each other with a constant width, and the check valve 117 in which the outer peripheral edge portion of the cutout portion 137 of the disc 111 serves as the valve body 118, and the inner peripheral edge portion of the cutout 136 of the disc 112 serves as a valve seat 119 is formed.

In the hard side damping force characteristic of the extension stroke, after the pilot valve 68 is opened, when the differential pressure between the pilot chamber 34 and the piston upper chamber 2A that is the upstream side of the main valve 32 (see FIG. 2) reaches the valve opening differential pressure (a predetermined differential pressure) of the check valve 117, the valve body 118 is bent so as to be rolled up with a ridge portion 120 of an inner peripheral surface and an end portion surface (abutment surface) of the seat portion 108 of the valve seat 105 as a fulcrum. Therefore, the valve body 118 is separated from the valve seat 119 and the check valve 117 is opened, and the oil liquid in the cylinder upper chamber 2A flows toward the pilot valve 68 through the first passage 133. At this time, a second orifice 134 formed by the cutout portion 135 of the disc 113 is formed in the pilot orifice unit 101.

In the hard side damping force characteristic of the extension stroke, when the pilot valve 68 is opened, a differential pressure is generated between the pilot chamber 34 and the piston upper chamber 2A that is the upstream side of the main valve 32 (see FIG. 2) by the differential pressure generated by the oil liquid flowing through the first orifice 131. Provisionally, assuming that the orifice having a total flow path area of a flow path area of the first orifice 131 and a flow path area of the second orifice 134 is an orifice A, in the hard side damping force characteristic of the extension stroke, a differential pressure generated by the oil liquid flowing through the orifice A by opening the check valve 117 is generated between the pilot chamber 34 and the piston upper chamber 2A.

The flow path area of the second orifice 134 is an area of the rectangular cross section of the cutout portion 135 of the disc 113, which is larger than the flow path area (an area of the rectangular cross section of the slit 132 of the disc 111) of the first orifice 131. Further, the flow path area of the first orifice 131 is smaller than the flow path area of a fixed orifice of the pilot orifice unit in the related art (see FIG. 6). Further, the flow path area of the orifice A, that is, the total flow path area of the flow path area of the first orifice 131 and the flow path area of the second orifice 134 is larger than the flow path area of the fixed orifice of the pilot orifice unit in the related art.

Next, an operation of the first embodiment will be described.

Here, the shock absorber 1 is attached between a sprung part and an unsprung part of a suspension device of a vehicle. When vibration is generated in the vehicle, the shock absorber 1 generates a damping force by controlling the flow of the oil liquid (working fluid) with respect to the stroke of the piston rod 6. At this time, the damping force generating mechanism 31 adjusts the damping force by changing the set load (valve opening pressure) of the first valve body 53 by controlling the thrust of the solenoid 91, during a contraction stroke (hereinafter "during the contraction stroke") of the piston rod 6. Meanwhile, during the extension stroke, the damping force is adjusted by changing the valve opening pressure of the damping valve 33 by varying the back pressure (pressure in the pilot chamber 34) of the main valve 32.

During the contraction stroke, when the oil liquid (working fluid) on the cylinder lower chamber 2B side is pressurized by the movement of the piston valve 5 (piston) in the cylinder 2, the oil liquid on the cylinder lower chamber 2B side passes through the contraction side passage 20 and opens the disc valve 102 to be distributed to the cylinder upper chamber 2A. At this time, the damping force of the valve characteristic is generated by the oil liquid flowing through the disc valve 102. The oil liquid amount that is entered into the cylinder 2 by the piston rod 6 is distributed to the reservoir 4 by opening the disc valve 11 when the pressure in the cylinder lower chamber 2B reaches the valve opening pressure of the disc valve 11 of the base valve 7.

Further, during the contraction stroke, when the first valve body 53 is opened against the thrust of the solenoid 91, the oil liquid on the cylinder lower chamber 2B side passes through the passage 57, the chamber 52, the passage 51, and the annular passage 50, and further, is distributed to the cylinder upper chamber 2A by opening a disc valve 116 including the discs 111 to 114. At this time, the damping force of the valve characteristic is generated by the oil liquid flowing through the disc valve 116. During the contraction stroke, the first valve body 53 and the second valve body 65 move integrally.

During the extension stroke, when the oil liquid (working fluid) on the cylinder upper chamber 2A side is pressurized by the movement of the piston valve 5 (piston) in the cylinder 2, when the second valve body 65 is closed, that is, the second valve body 65 is seated on the valve seat 64 of the first valve body 53, the upstream side of the pilot chamber 34 is communicated with the cylinder upper chamber 2A through the introduction passage 27 including the radial passage 127, the annular passage 126, the axial passage 125, the passage 124, the annular passages 122 and 121, and the first orifice 131 formed in the pilot orifice unit 101 (disc valve 116). Therefore, the oil liquid on the cylinder upper chamber 2A side is introduced to the pilot chamber 34 through the introduction passage 27. Meanwhile, the downstream side of the pilot chamber 34 is communicated with the second valve chamber 69 through the passage 123, the annular passage 50, the passage 51, the chamber 52, and the passage 70.

Then, when a soft side damping force characteristic is exhibited in the extension stroke (hereinafter "in the soft side damping force characteristic"), the pilot valve 68 (the second valve body 65) is opened by controlling the thrust (control current) of the solenoid 91. Therefore, the oil liquid in the cylinder upper chamber 2A flows to the cylinder lower chamber 2B by passing through a control passage including the first orifice 131 of the pilot orifice unit 101, the annular passages 121 and 122, the passage 123, the annular passage 50, the passage 51, the chamber 52, the passage 70, the second valve chamber 69, the bore 63, the passage 71, the first valve chamber 56, and the passage 57. At this time, a differential pressure is generated between the upstream side (cylinder upper chamber 2A) and the downstream side (pilot chamber 34) of the first orifice 131, and when the differential pressure reaches the set load (set differential pressure) of the main valve 32, the main valve 32 is opened.

Then, when the hard side damping force characteristic is exhibited in the extension stroke (hereinafter "in the hard side damping force characteristic"), the pilot valve 68 (the second valve body 65) is closed by the set load adjusted by controlling the thrust (control current) of the solenoid 91. When the piston speed increases, the pressure in the cylinder upper chamber 2A reaches the valve opening pressure of the pilot valve 68 (the second valve body 65), and the pilot valve 68 is opened, the oil liquid from the cylinder upper chamber 2A is distributed to the cylinder lower chamber 2B through the control passage described above. At this time, a differential pressure is generated between the upstream side (cylinder upper chamber 2A) and the downstream side (pilot chamber 34) of the first orifice 131.

Further, when the differential pressure between the upstream side (upstream side of the check valve 117) and the downstream side (downstream side of the check valve 117) of the first orifice 131 reaches the valve opening pressure (valve opening differential pressure) of the check valve 117, the check valve 117 is opened. Therefore, the oil liquid in the cylinder upper chamber 2A is distributed to the first passage 133 of the pilot orifice unit 101 provided in parallel with the first orifice 131, and a differential pressure is generated between the upstream side and the downstream side of the second orifice 134. Then, in the first embodiment, when the check valve 117 is opened in the hard side damping force characteristic, it is equivalent to the case where the orifice A described above, that is, an orifice having the total flow path area of the flow path area of the first orifice 131 and the flow path area of the second orifice 134 is provided in the pilot orifice unit 101. Therefore, the differential pressure generated between the upstream side and the downstream side of the orifice A is generated between the cylinder upper chamber 2A and the pilot chamber 34.

Figure 6:
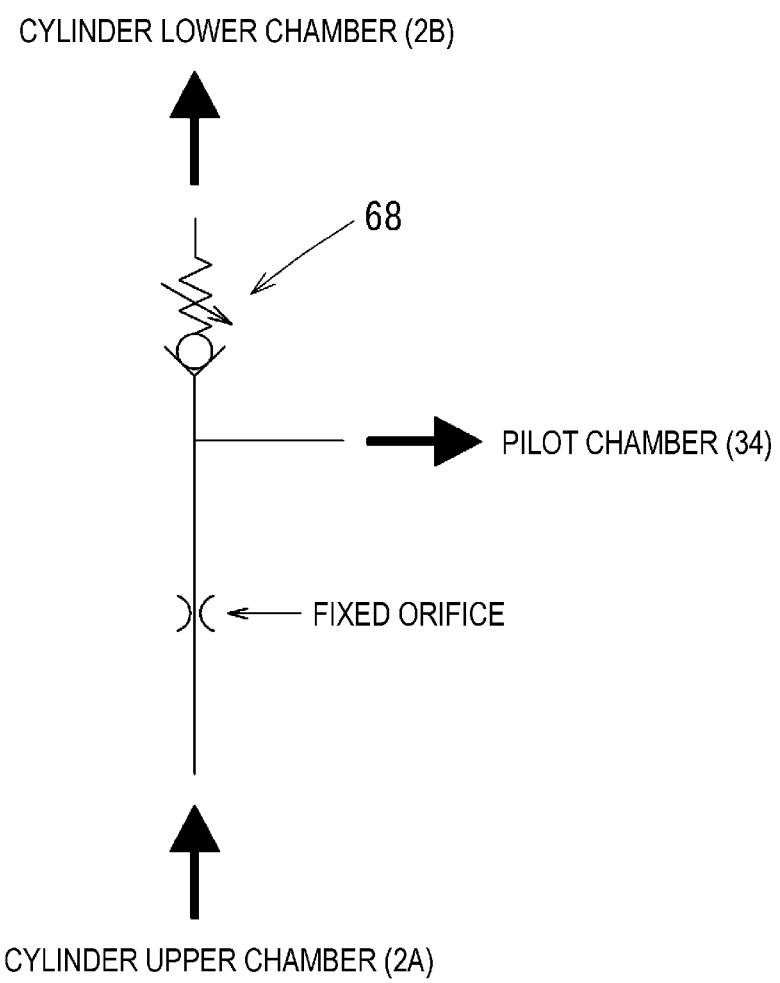
FIG. 6 is an explanatory view of the first embodiment, and a conceptional view of a pilot orifice unit in the related art.
Figure 7:
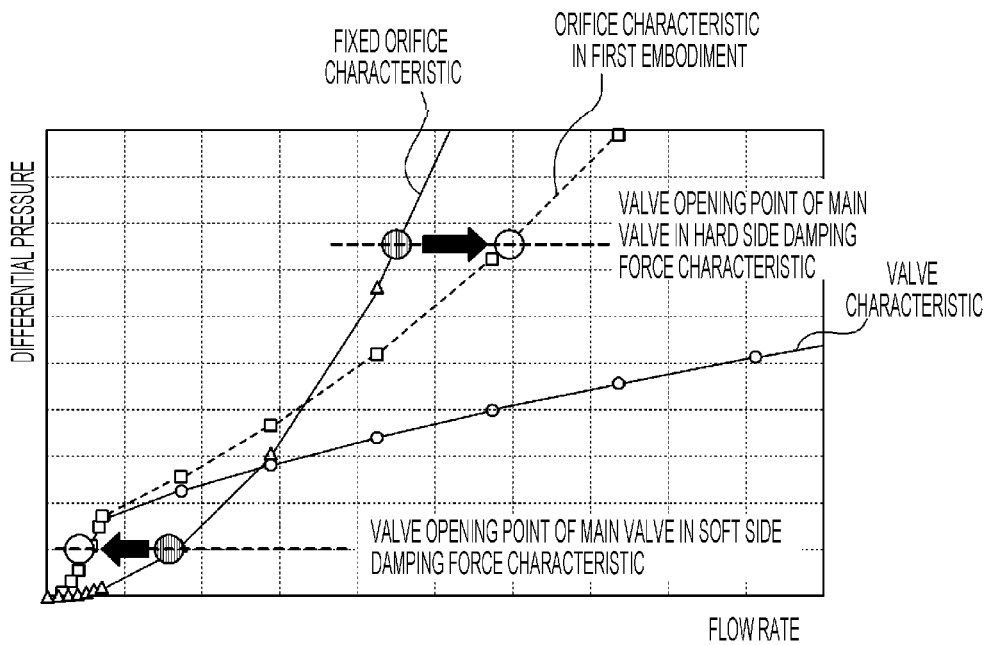
FIG. 7 is a graph comparing an orifice characteristic during an extension stroke between the pilot orifice unit according to the first embodiment and the pilot orifice unit in the related art.
Figure 8:
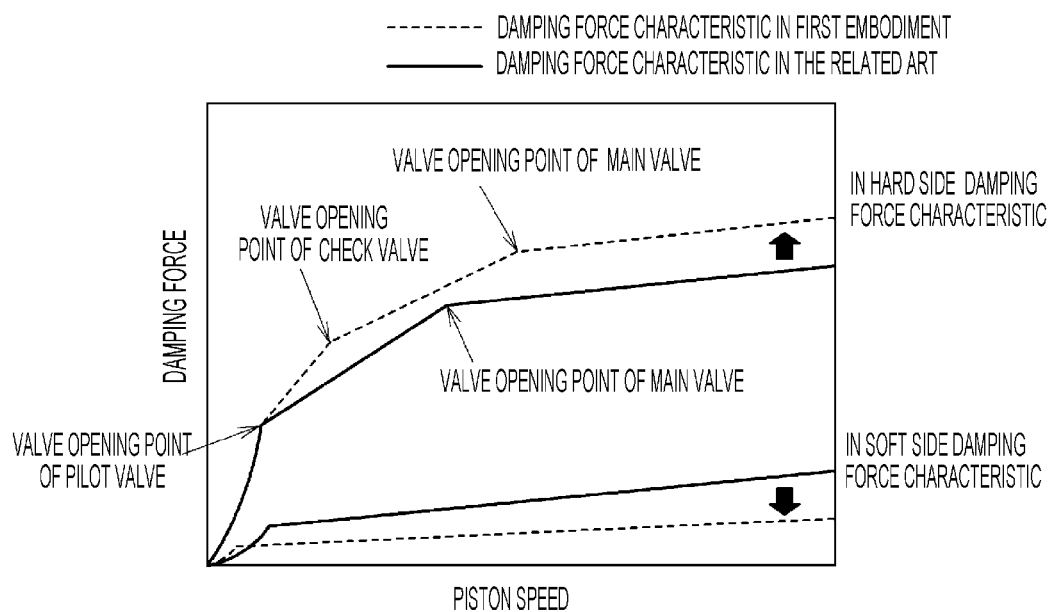
FIG. 8 is a graph comparing a damping force characteristic between a damping force generating mechanism provided with the pilot orifice unit according to the first embodiment and a damping force generating mechanism provided with the pilot orifice unit in the related art.

Here, FIG. 7 is a graph comparing the orifice characteristic during the extension stroke between the pilot orifice unit 101 according to the first embodiment and the pilot orifice unit in the related art (see FIG. 6). Further, FIG. 8 is a graph comparing the damping force characteristic between the shock absorber 1 according to the first embodiment including the pilot orifice unit 101 and the shock absorber including the pilot orifice unit in the related art (see FIG. 6). The "differential pressure" in the following refers to the pressure difference between the upstream side and the downstream side of the orifice, and moreover, the pressure difference between the cylinder upper chamber 2A and the pilot chamber 34.

In the soft side damping force characteristic, in the pilot orifice unit 101, the differential pressure is generated by the first orifice 131 depending on the valve opening of the pilot valve 68 (control valve), while in the pilot orifice unit in the related art, the differential pressure is generated by the fixed orifice (see FIG. 6). Here, the flow path area of the first orifice 131 is smaller than the flow path area of the fixed orifice. Therefore, as illustrated in FIG. 7, the pilot orifice unit 101 has a higher rate of increase in the differential pressure that that of the pilot orifice unit in the related art, and reaches the valve opening pressure (valve opening differential pressure) of the main valve 32 with a smaller flow rate of the oil liquid. Therefore, as illustrated in FIG. 8, the pilot orifice unit 101 reaches the valve opening pressure (valve opening differential pressure) of the main valve 32 at a lower piston speed with respect to the pilot orifice unit in the related art. Therefore, it is possible to reduce the damping force when the main valve 32 is opened, and the riding comfort of the vehicle may be improved.

Further, in the hard side damping force characteristic, in the pilot orifice unit 101, the differential pressure is generated by the provisional orifice A having the total flow path area of the flow path area of the first orifice 131 and the flow path area of the second orifice 134 by opening the pilot valve 68 (control valve), and also opening the check valve 117, while in the pilot orifice unit in the related art, the differential pressure is generated by the fixed orifice (see FIG. 6). Here, the flow path area of the orifice A is larger than the flow path area of the fixed orifice. Therefore, as illustrated in FIG. 7, the pilot orifice unit 101 has a lower rate of increase in the differential pressure than that of the pilot orifice unit in the related art, and thus, in order to reach the valve opening pressure (valve opening differential pressure) of the main valve 32, a larger flow rate of the oil liquid is necessary. Therefore, as illustrated in FIG. 8, the pilot orifice unit 101 reaches the valve opening pressure (valve opening differential pressure) of the main valve 32 at a higher piston speed with respect to the pilot orifice unit in the related art. Therefore, it is possible to increase the damping force when the main valve 32 is opened, and steering stability of the vehicle may be improved.

Further, in the pilot orifice unit in the related art (see FIG. 6), there are two shift points of the damping force characteristic in the hard side damping force characteristic, that is, a valve opening point of the pilot valve (control valve) and a valve opening point of the main valve. Meanwhile, in the pilot orifice unit 101 according to the first embodiment, there are three shift points of the damping force characteristic in the hard side damping force characteristic, that is, a valve opening point of the pilot valve 68 (control valve), a valve opening point of the check valve 117, and a valve opening point of the main valve 32. As described above, in the first embodiment, the check valve 117 is opened between the valve opening point of the pilot valve 68 and the valve opening point of the main valve 32 to switch the damping force characteristic, and thus, the change in inclination of the damping force characteristic may be reduced. Therefore, it is possible to smooth the change of the damping force characteristic, and by reducing valve vibration or jerk, it is possible to further improve the sound vibration or the riding comfort of the vehicle.

In the following, the operation effect of the first embodiment will be described.

The shock absorber 1 according to the first embodiment includes: the cylinder 2 filled with a fluid; the piston 5 slidably inserted into the cylinder 2; the piston rod 6 connected to the piston 5 and extending outside the cylinder 2; the main valve 32 that generates a damping force by controlling a flow of the fluid generated by sliding of the piston 5 in the cylinder 2; the pilot chamber 34 that applies pressure to the main valve 32 in the valve closing direction; the introduction passage 27 that introduces the fluid into the pilot chamber 34; the pilot passage that communicates the pilot chamber 34 and the downstream side of the main valve 32 with each other; and the control valve 68 provided in the pilot passage. On the upstream side of the pilot passage from the control valve 68, the pilot passage is provided with the first orifice 131 that always communicates, the first passage 133 provided in parallel with the first orifice 131, the first check valve 117 that is opened at a predetermined differential pressure and allows the flow toward the control valve 68 through the first passage 133, and the second orifice 134.

According to the first embodiment, the flow path area of the first orifice 131 is made smaller than the flow path area of the fixed orifice in the related art, and thus, in the soft side damping force characteristic, the rate of increase in the differential pressure between the upstream side and the downstream side of the orifice is increased as compared with the fixed orifice in the related art. Therefore, the main valve 32 is opened with a smaller flow rate, and moreover, reaches the valve opening pressure (valve opening differential pressure) at a lower piston speed. As described above, in the first embodiment, it is possible to reduce the damping force when the main valve 32 is opened in the soft side damping force characteristic, and the riding comfort of the vehicle may be improved.

Further, in the hard side damping force characteristic, the differential pressure is generated by the orifice A equivalent to the orifice having the total flow path area of the flow path area of the first orifice 131 and the flow path area of the second orifice 134, which is larger than the flow path area of the first orifice 131, by opening the check valve 117. Therefore, in the hard side damping force characteristic, the rate of increase in the differential pressure between the upstream side and the downstream side of the orifice is decreased as compared with the fixed orifice in the related art. Therefore, the main valve 32 is opened with a greater flow rate, and moreover, reaches the valve opening pressure (valve opening differential pressure) at a higher piston speed. As described above, in the first embodiment, it is possible to increase the damping force when the main valve 32 is opened in the hard side damping force characteristic, and the steering stability of the vehicle may be improved.

Further, in the first embodiment, the check valve 117 is opened between the valve opening point of the control valve 68 and the valve opening point of the main valve 32 to switch the damping force characteristic, and thus, the change in the inclination of the damping force characteristic may be reduced. Therefore, it is possible to smooth the change of the damping force characteristic, and by reducing valve vibration or jerk, it is possible to further improve the sound vibration or the riding comfort of the vehicle.

In the first embodiment, the second orifice 134 and the check valve 117 are separately configured, but a check valve including an orifice, that is, the second orifice 134 and the check valve 117 may be integrally formed.

Second Embodiment

Figure 9:
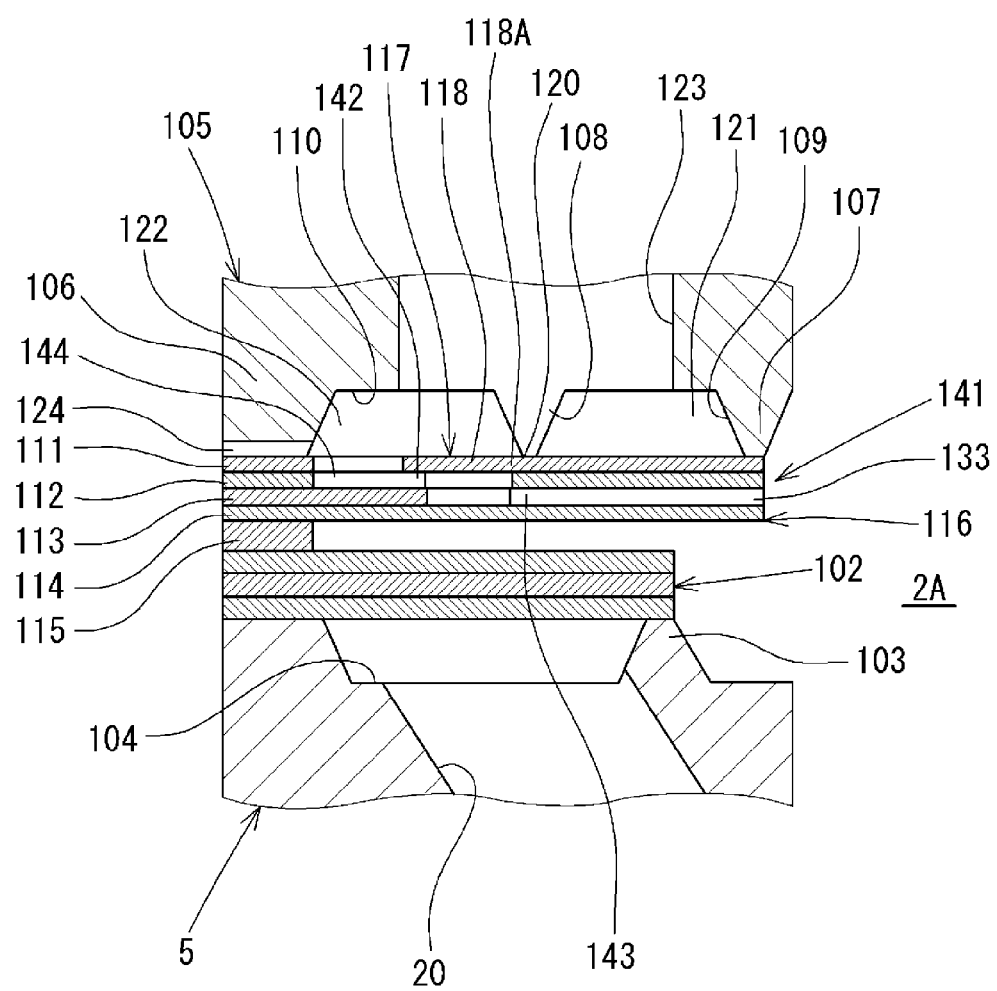
FIG. 9 is an explanatory view of a pilot orifice unit of a second embodiment.
Figure 10:
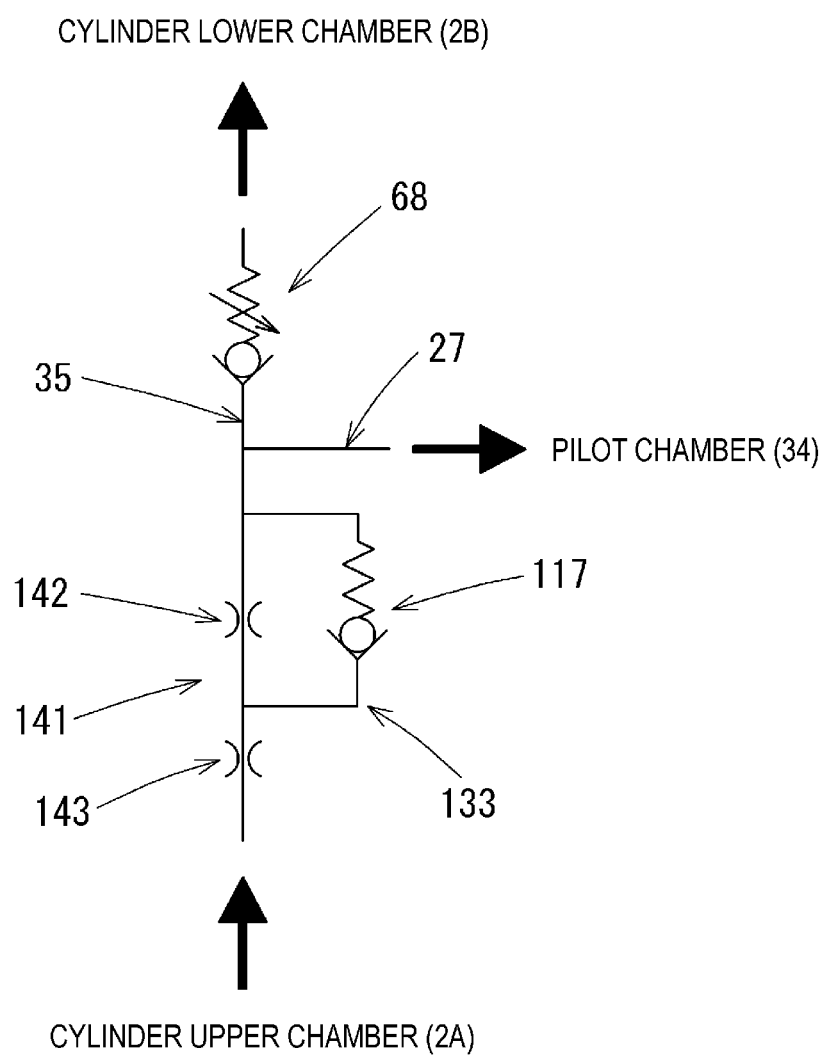
FIG. 10 is a conceptional view of the pilot orifice unit of the second embodiment.

Next, a second embodiment will be described with reference to FIGS. 9 and 10. The same or equivalent components as those in the first embodiment will be assigned with the same names and reference numerals, and detailed description thereof will be omitted.

In the first embodiment described above, the pilot orifice unit 101 is configured so as to be equivalent to the case where the orifice A having the total flow path area of the flow path area of the first orifice 131 and the flow path area of the second orifice 134 by disposing the first orifice 131 and the second orifice 134 in parallel and opening the check valve 117 in the hard side damping force characteristic of the extension stroke.

Meanwhile, in the second embodiment, a pilot orifice unit 141 is configured such that a second orifice 143 is disposed on the upstream side (cylinder upper chamber 2A) from the first passage 133, and also, a first orifice 142 and the second orifice 143 are disposed in series. The first orifice 142 is formed between the first disc 111 (valve body 118) and the third disc 113 and always communicates the cylinder upper chamber 2A and the pilot chamber 34 with each other by providing a cutout portion 144 in the valve seat 119 (see FIG. 3) on which the valve body 118 of the check valve 117 is seated.

In the second embodiment, the flow path area of the second orifice 143 is set to be larger than the flow path area of the fixed orifice of the pilot orifice unit in the related art (see FIG. 6), for example, to be the total flow path area of the flow path area of the first orifice 131 and the flow path area of the second orifice 134. Therefore, in the hard side damping force characteristic, by opening the check valve 117, the oil liquid passing through the second orifice 143 is branched into a flow toward the first orifice 142 and a flow toward the first passage 133 provided with the check valve 117, and the pilot orifice unit 141 substantially generates a differential pressure by the second orifice 143.

Here, the flow path area of the second orifice 143 is larger than the flow path area of the fixed orifice. Therefore, in the pilot orifice unit 141, the rate of increase in the differential pressure is decreased as compared with the pilot orifice unit in the related art, and thus, in order to reach the valve opening pressure (valve opening differential pressure) of the main valve 32, a larger flow rate of the oil liquid is necessary. Therefore, the pilot orifice unit 141 reaches the valve opening pressure (valve opening differential pressure) of the main valve 32 at a higher piston speed as compared with the pilot orifice unit in the related art. According to the second embodiment, the same operation effect as that of the first embodiment may be obtained.

Third Embodiment

Figure 11:
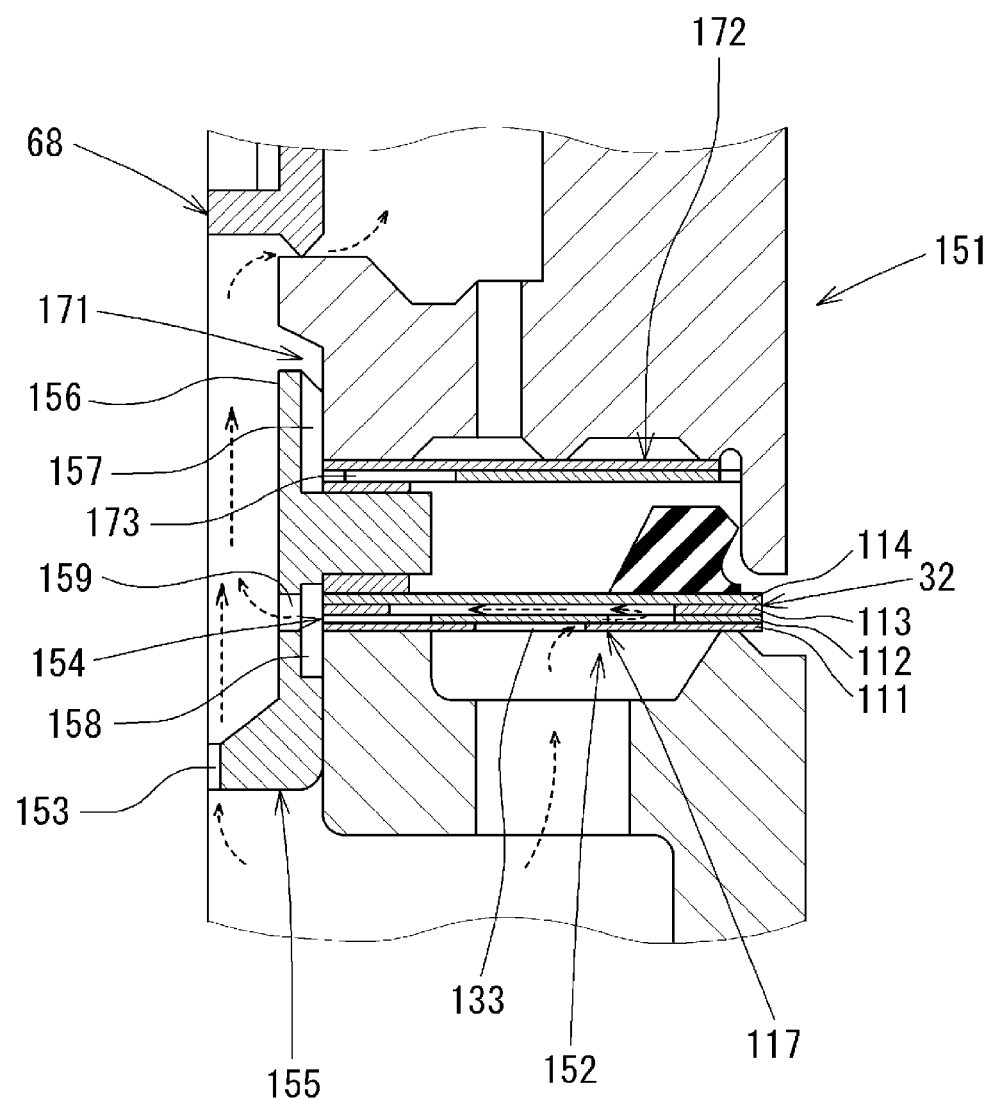
FIG. 11 is an explanatory view of a pilot orifice unit of a third embodiment.
Figure 12:
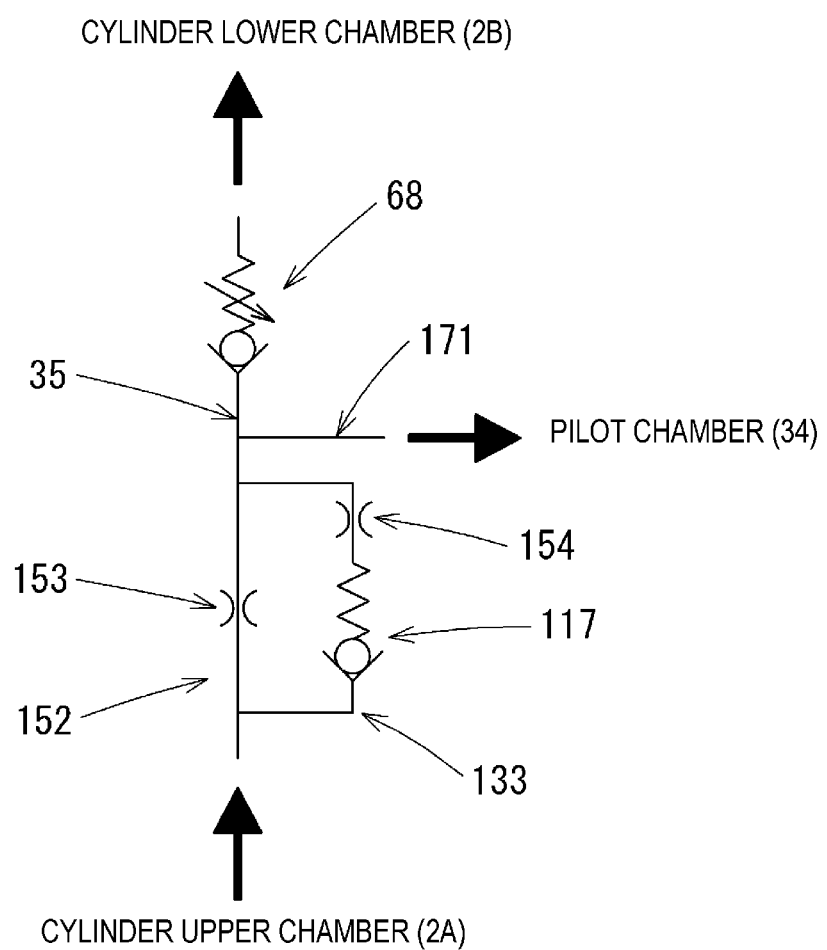
FIG. 12 is a conceptional view of the pilot orifice unit of the third embodiment.

Next, a third embodiment will be described with reference to FIGS. 11 and 12. The same or equivalent components as those in the embodiments described above will be assigned with the same names and reference numerals, and detailed description thereof will be omitted.

In the third embodiment, the structure in which the first orifice 131 and the second orifice 134 of the pilot orifice unit 101 according to the first embodiment are disposed in parallel is applied to a pilot orifice unit 152 of a damping force adjusting hydraulic shock absorber of a control valve horizontal arrangement type. Since the basic structure of a damping force generating mechanism 151 is the same as the damping force generating mechanism assembled in a semi-active suspension device in the related art, detailed description thereof will be omitted.

In the pilot orifice unit 152 according to the third embodiment, a first orifice 153 is formed in a lower end portion of a shaft hole 156 of a pilot pin 155, and the first passage 133 is formed in the stacked discs 111 to 114 that constitute the main valve 32. The check valve 117 and a second orifice 154 are provided in the first passage 133. The check valve 117 is opened when the differential pressure between an internal pressure of the shaft hole 156 that communicates with the cylinder upper chamber 2A and the pilot chamber 34 reaches a predetermined value by opening the pilot valve 68 (control valve). The second orifice 154 is provided on the downstream side (pilot valve 68 side) of the check valve 117, and is also disposed in parallel with respect to the first orifice 153.

In the third embodiment, the oil liquid in the cylinder upper chamber 2A is introduced to the pilot chamber 34 through an introduction passage 171 including the first orifice 153, the shaft hole 156 of the pilot pin 155, an axial passage 157 formed on an outer peripheral surface of the pilot pin 155, and a passage 173 formed in a flexible disc valve 172. Then, in the hard side damping force characteristic, the check valve 117 is opened when the pilot valve 68 (control valve) is opened, and also the differential pressure between the cylinder upper chamber 2A and the pilot chamber 34 reaches the valve opening pressure (valve opening differential pressure) of the check valve 117. Therefore, the first passage 133 is communicated with the introduction passage 171 through an annular passage 158 and a radial passage 159 formed on the outer peripheral surface of the pilot pin 155.

As described above, in the hard side damping force characteristic, the pilot orifice unit 152 generates the differential pressure by the provisional orifice A having the total flow path area of the flow path area of the first orifice 153 and the flow path area of the second orifice 154. According to the third embodiment, the same operation effect as that of the first and second embodiments may be obtained.

Fourth Embodiment

Figure 13:
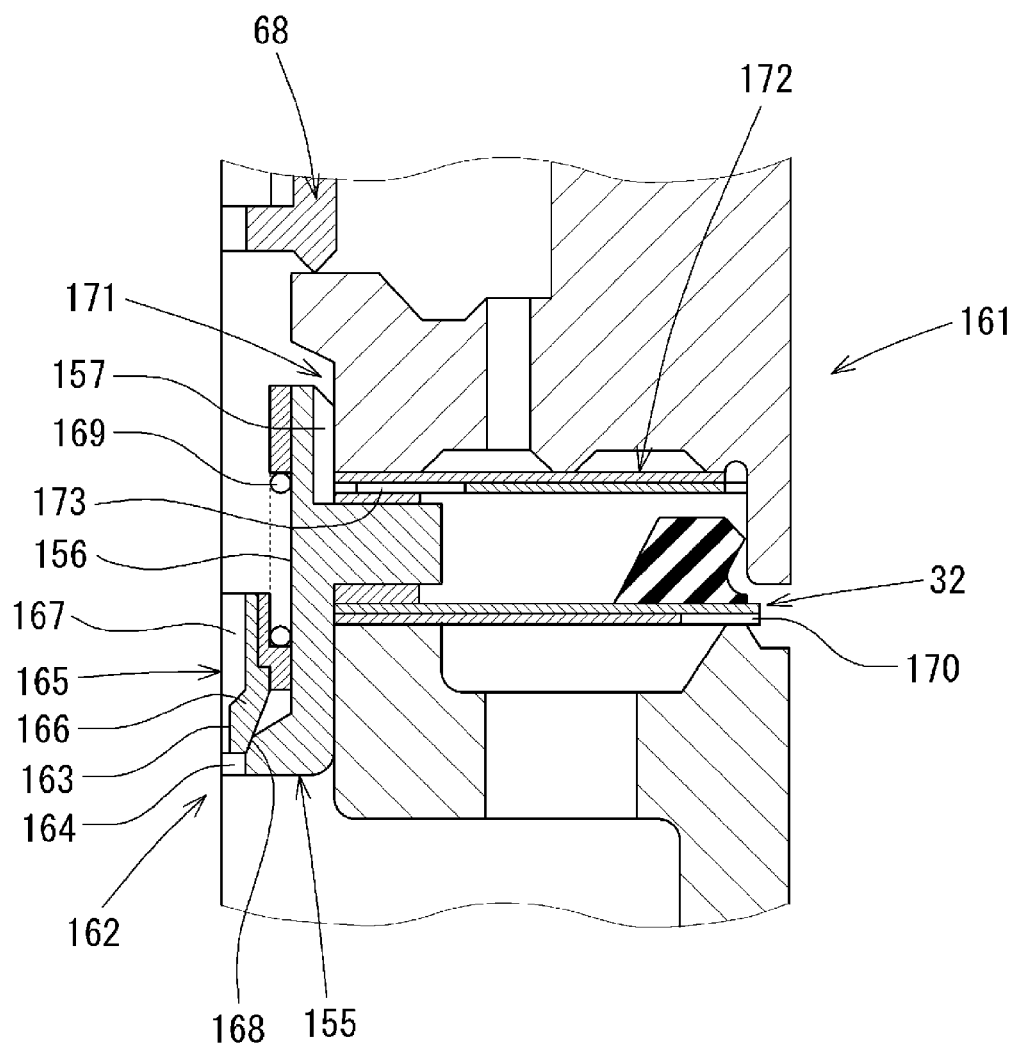
FIG. 13 is an explanatory view of a pilot orifice unit of a fourth embodiment.
Figure 14:
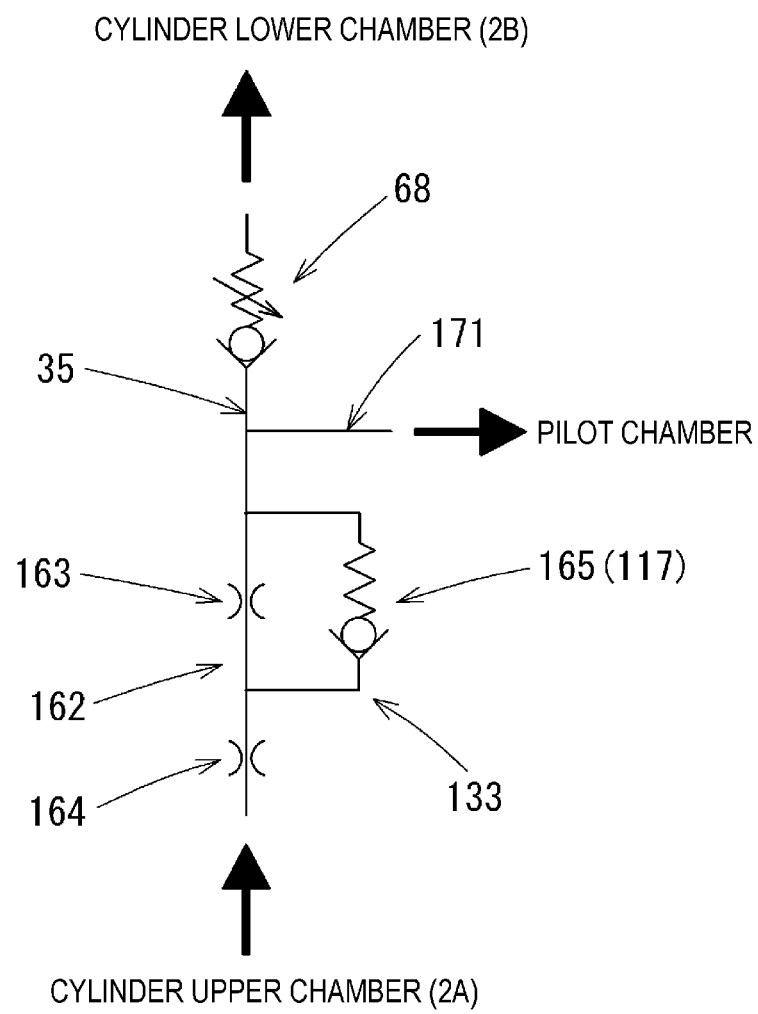
FIG. 14 is a conceptional view of the pilot orifice unit of the fourth embodiment.

Next, a fourth embodiment will be described with reference to FIGS. 13 to 15. The same or equivalent components as those in the embodiments described above will be assigned with the same names and reference numerals, and detailed description thereof will be omitted.

In the second embodiment described above, the pilot orifice unit 141 is configured such that the second orifice 143 is disposed on the upstream side (cylinder upper chamber 2A) from the first passage 133, and also, the first orifice 142 and the second orifice 143 are disposed in series. In the fourth embodiment, the configuration according to the second embodiment is applied to a pilot orifice unit 162 of a damping force generating mechanism 161 including a poppet valve 165. Since the basic structure of the damping force generating mechanism 161 is the same as the damping force generating mechanism in the related art including the poppet valve, detailed description thereof will be omitted.

In the pilot orifice unit 162 according to the fourth embodiment, a first orifice 163 is formed in a lower end portion of a shaft hole 167 (first passage) of a valve body 166 of the poppet valve 165 (first check valve) to always communicate the cylinder upper chamber 2A and the pilot chamber 34. Meanwhile, a second orifice 164 is formed in the lower end portion of the shaft hole 156 of the pilot pin 155. The second orifice 164 is communicated with the pilot chamber 34 by opening the poppet valve 165 by separating the valve body 166 from a valve seat 168 formed in the pilot pin 155. The valve body 166 is urged in the valve closing direction (downward in FIG. 13) by a valve spring 169 accommodated in the shaft hole 156 of the pilot pin 155.

Then, when the poppet valve 165 is closed, the cylinder upper chamber 2A and the pilot chamber 34 are communicated with each other through the introduction passage 171 including the first orifice 163 disposed in series with respect to the second orifice 164, the shaft hole 167 of the valve body 166, the shaft hole 156 of the pilot pin 155, the axial passage 157 formed on the outer peripheral surface of the pilot pin 155, and the passage 173 formed in the flexible disc valve 172.

Figure 15:
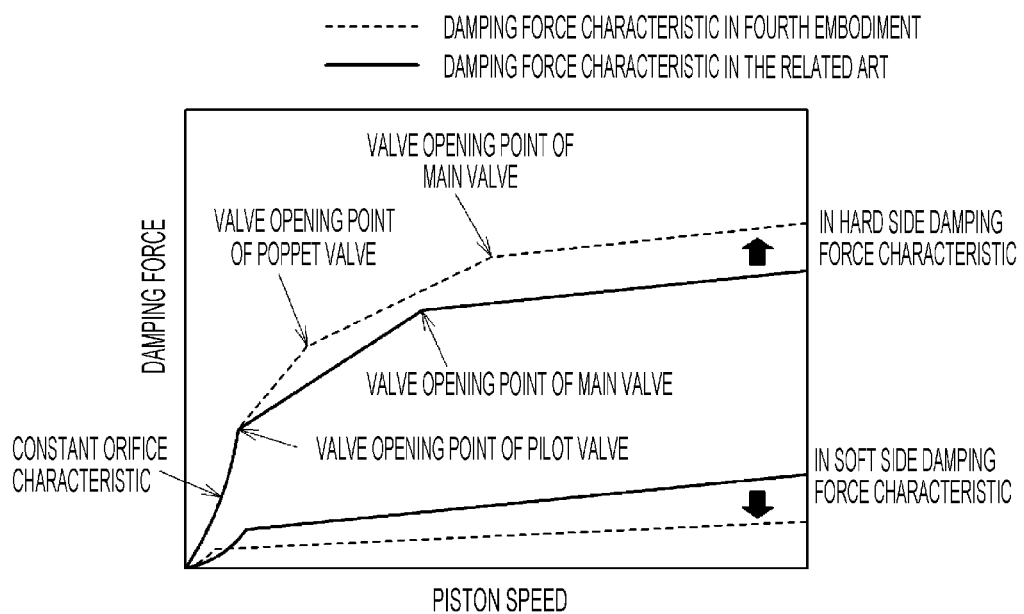
FIG. 15 is a graph comparing a damping force characteristic between a damping force generating mechanism provided with the pilot orifice unit according to the fourth embodiment and the damping force generating mechanism provided with the pilot orifice unit in the related art.

Referring to FIG. 15, before opening the pilot valve 68 (control valve) in the hard side damping force characteristic, the damping force generating mechanism 161 generates a damping force of a constant orifice characteristic by a fixed orifice 170 (see FIG. 13) provided in the main valve 32. When the piston speed is increased, the pilot valve 68 is opened, and the oil liquid is distributed to the first orifice 163, the damping force generating mechanism 161 generates a damping force of the orifice characteristic by the first orifice 163, strictly, a damping force that is equivalent to the orifice having the total flow path area of the flow path area of the fixed orifice 170 and the flow path area of the first orifice 163. When the piston speed is further increased, the valve body 166 is separated from the valve seat 168 against the urging force of the valve spring 169, and the poppet valve 165 is opened, the oil liquid is distributed to the second orifice 164. Therefore, the damping force generating mechanism 161 substantially generates a damping force of the orifice characteristic by the second orifice 164.

When the piston speed is further increased so that the differential pressure between the cylinder upper chamber 2A and the pilot chamber 34 reaches the valve opening pressure (valve opening differential pressure) of the main valve 32, and the main valve 32 is opened, the damping force generating mechanism 161 generates a damping force of the valve characteristic by the main valve 32. In the fourth embodiment, there are three shift points of the damping force characteristic in the hard side damping force characteristic, that is, the valve opening point of the pilot valve 68 (control valve), the valve opening point of the poppet valve 165 (first check valve), and the valve opening point of the main valve 32. As described above, in the fourth embodiment, the poppet valve 165 is opened between the valve opening point of the pilot valve 68 and the valve opening point of the main valve 32 to switch the damping force characteristic, and thus, the change in the inclination of the damping force characteristic may be reduced. According to the fourth embodiment, the same operation effect as that of the first to third embodiments may be obtained.

Fifth Embodiment

Figure 16:
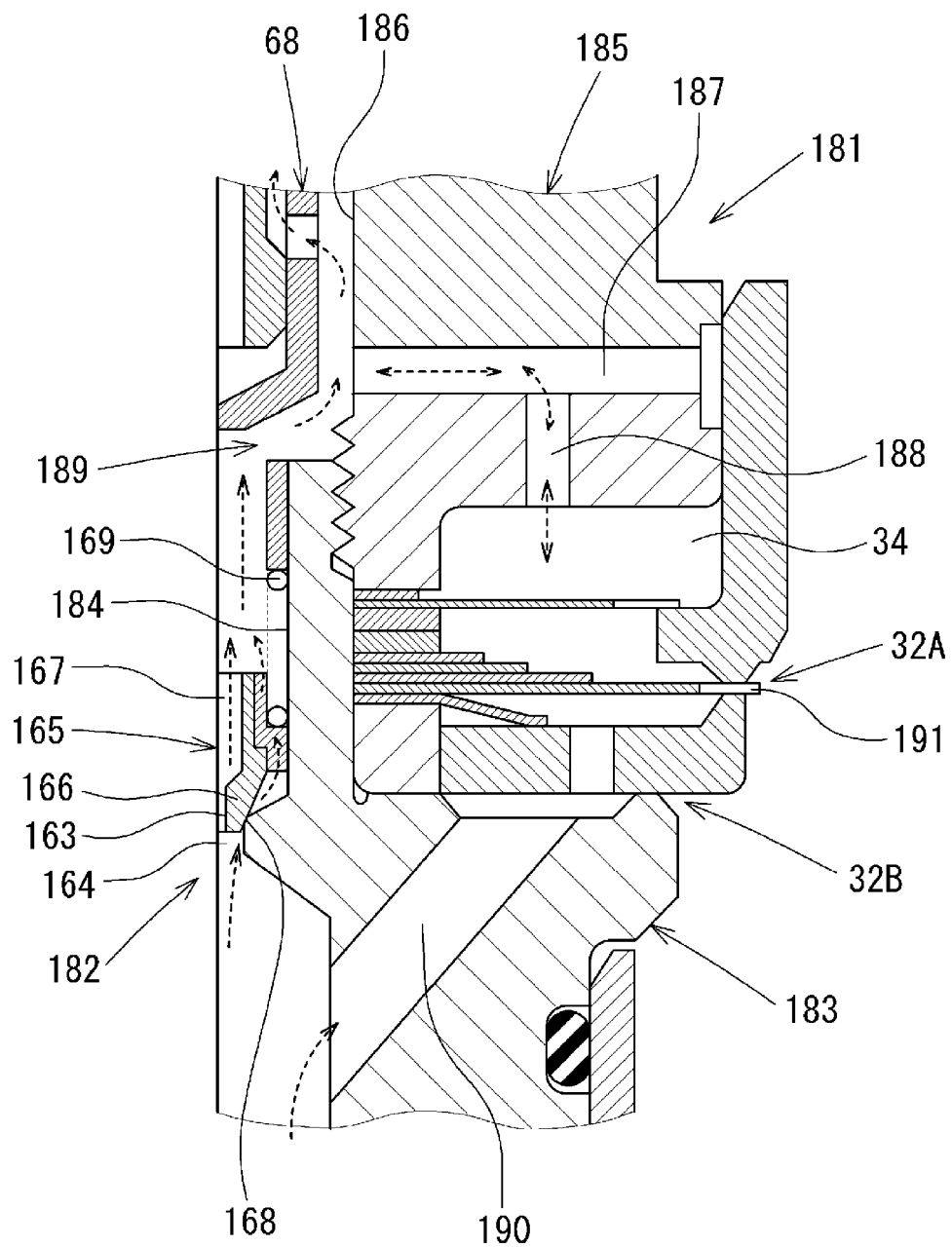
FIG. 16 is an explanatory view of a pilot orifice unit of a fifth embodiment.
Figure 17:
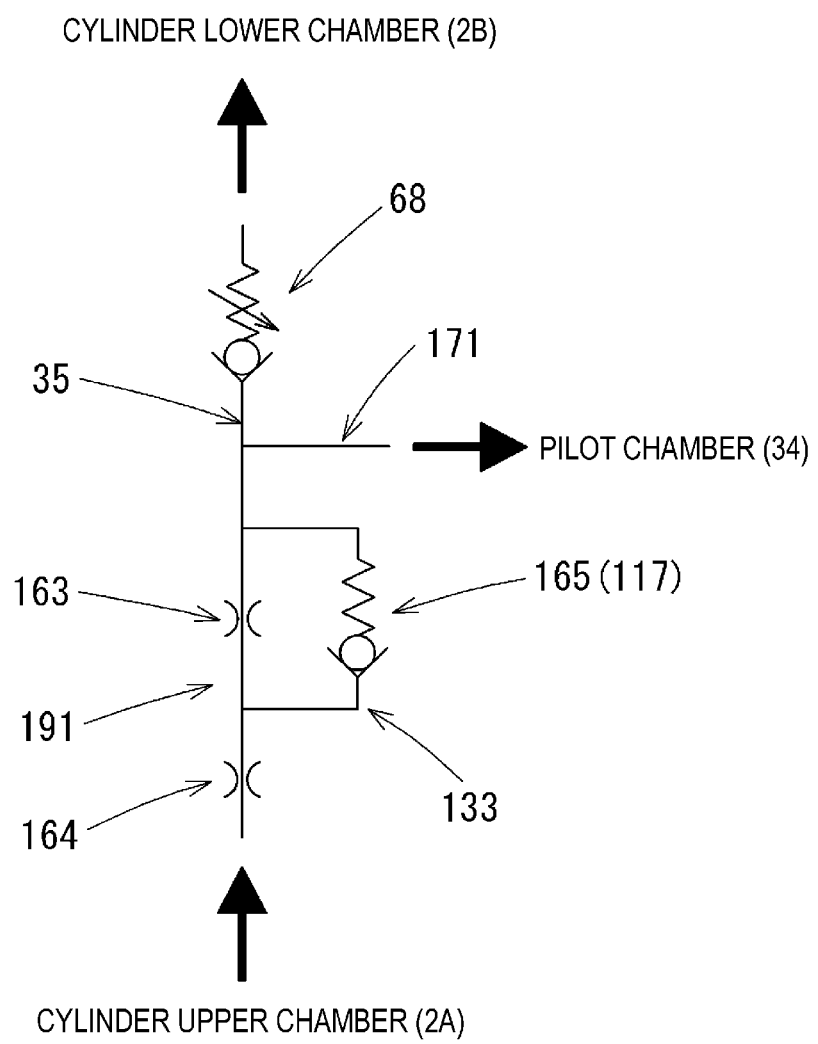
FIG. 17 is a conceptional view of the pilot orifice unit of the fifth embodiment.

Next, a fifth embodiment will be described with reference to FIGS. 16 to 18. The same or equivalent components as those in the embodiments described above will be assigned with the same names and reference numerals, and detailed description thereof will be omitted.

In the fourth embodiment described above, the pilot orifice unit 162 is configured such that the second orifice 164 is communicated with the pilot chamber 34 by opening the poppet valve 165. In the fifth embodiment, the configuration according to the fourth embodiment is applied to a pilot orifice unit 182 of a damping force generating mechanism 181 in which the main valve is gradually opened, in other words, a port 190 is gradually relieved. Since the basic structure of the damping force generating mechanism 181 in which the main valve is gradually opened is the same as that of a damping force mechanism in the related art (see, e.g., Japanese Patent Laid-Open Publication No. 2014-173715) in which the port is relieved in two steps, detailed description thereof will be omitted.

When the poppet valve 165 in the fifth embodiment is closed, the cylinder upper chamber 2A and the pilot chamber 34 are communicated with each other through an introduction passage 189 including the first orifice 163 disposed in series with respect to the second orifice 164, the shaft hole 167 of the valve body 166, a shaft hole 184 of a valve seat member 183, a shaft hole 186 of a valve housing 185, a radial passage 187 formed in the valve housing 185, and an axial passage 188 formed on the valve housing 185.

Figure 18:
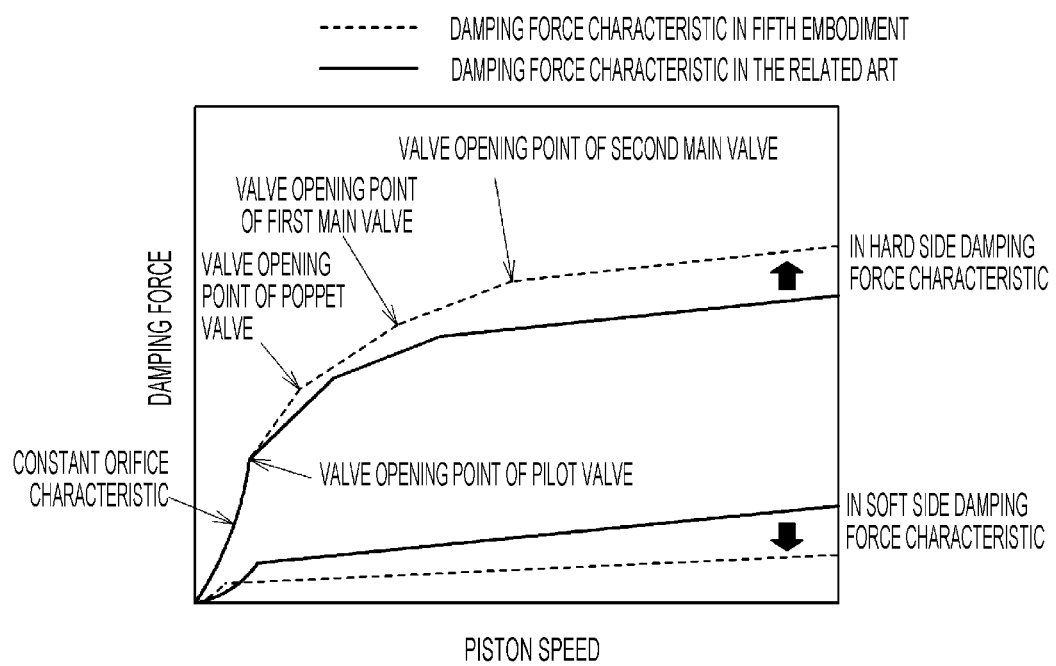
FIG. 18 is a graph comparing a damping force characteristic between a damping force generating mechanism provided with the pilot orifice unit according to the fifth embodiment and the damping force generating mechanism provided with the pilot orifice unit in the related art.

Referring to FIG. 18, before opening the pilot valve 68 (control valve) in the hard side damping force characteristic, the damping force generating mechanism 181 generates a damping force of a constant orifice characteristic by a fixed orifice 191 (see FIG. 16) provided in a first main valve 32A. When the piston speed is increased, the pilot valve 68 is opened (see FIG. 16), and the oil liquid is distributed to the first orifice 163, the damping force generating mechanism 181 generates a damping force of the orifice characteristic by the first orifice 163, strictly, a damping force that is equivalent to the orifice having the total flow path area of the flow path area of the fixed orifice 191 and the flow path area of the first orifice 163. When the piston speed is further increased, the valve body 166 is separated from the valve seat 168 against the urging force of the valve spring 169, and the poppet valve 165 is opened, the oil liquid is distributed to the second orifice 164. Therefore, the damping force generating mechanism 181 substantially generates a damping force of the orifice characteristic by the second orifice 164.

When the piston speed is further increased so that the differential pressure between the cylinder upper chamber 2A and the pilot chamber 34 reaches the valve opening pressure (valve opening differential pressure) of the first main valve 32A, and the first main valve 32A is opened, the damping force generating mechanism 181 generates a damping force of the valve characteristic by the first main valve 32A. When the piston speed is further increased so that the differential pressure between the cylinder upper chamber 2A and the pilot chamber 34 reaches the valve opening pressure (valve opening differential pressure) of a second main valve 32B, and the second main valve 32B is opened, the damping force generating mechanism 181 generates a damping force of the valve characteristic by the second main valve 32B.

In the fifth embodiment, there are four shift points of the damping force characteristic in the hard side damping force characteristic, that is, the valve opening point of the pilot valve 68 (control valve), the valve opening point of the poppet valve 165 (first check valve), the valve opening point of the first main valve 32A, and the valve opening point of the second main valve 32B. As described above, in the fifth embodiment, the poppet valve 165 is opened between the valve opening point of the pilot valve 68 and the valve opening point of the first main valve 32A to switch the damping force characteristic, and thus, the change in the inclination of the damping force characteristic may be further reduced. According to the fifth embodiment, it is possible to further smooth the change of the damping force characteristic, and by reducing valve vibration or jerk, it is possible to further improve the sound vibration or the riding comfort of the vehicle.

Sixth Embodiment

Next, a sixth embodiment will be described with reference to FIGS. 19 to 22. The same or equivalent components as those in the embodiments described above will be assigned with the same names and reference numerals, and detailed description thereof will be omitted.

In the sixth embodiment, a pilot orifice unit 202 is configured by providing a spool valve body 205 (second check valve) on the outer periphery of the poppet valve 165 (first check valve) in the fourth embodiment.

A hollow shaft-shaped spool 203 is inserted (accommodated) into the shaft hole 156 (hollow portion) of the pilot pin 155. The valve body 166 of the poppet valve 165 is formed in a lower end portion of the spool 203. A valve body 206 of the spool valve 205 is formed in an upper end portion of the spool 203. A cylindrical bush 209 is pressed to (fitted into) the upper end portion of the shaft hole 156 of the pilot pin 155, that is, the end portion on the side opposite to the second orifice 164 side. A small diameter portion 210 that slidably abuts on an outer peripheral surface 207 of the valve body 206 of the spool valve 205 is formed on a lower end side of an inner peripheral surface of the bush 209. A large diameter portion 211 continuous with the small diameter portion 210 via a stepped portion is formed on an upper end side of the inner peripheral surface of the bush 209. A valve seat 208 of the spool valve 205 is formed in an upper end peripheral edge of the small diameter portion 210.

Figure 19:
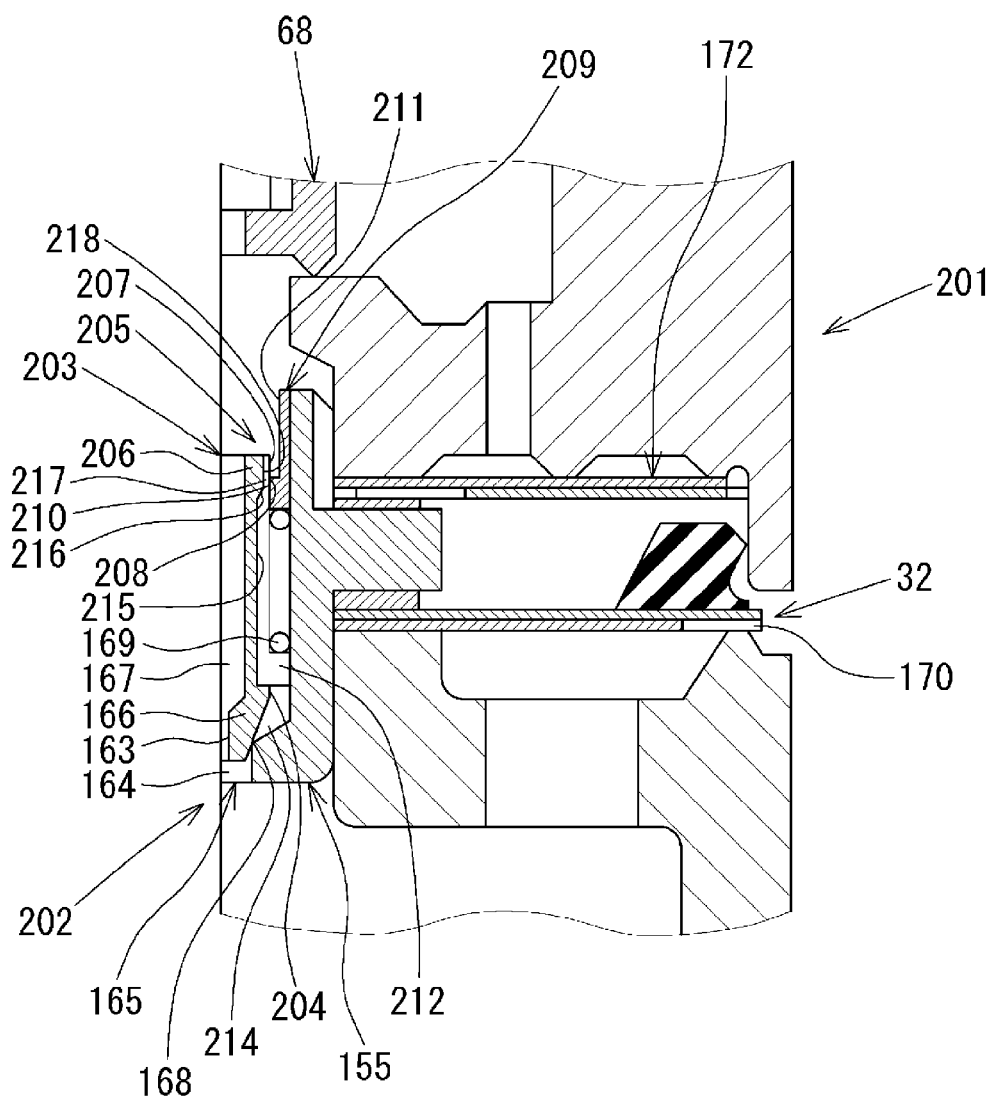
FIG. 19 is an explanatory view of a pilot orifice unit of a sixth embodiment.
Figure 20:
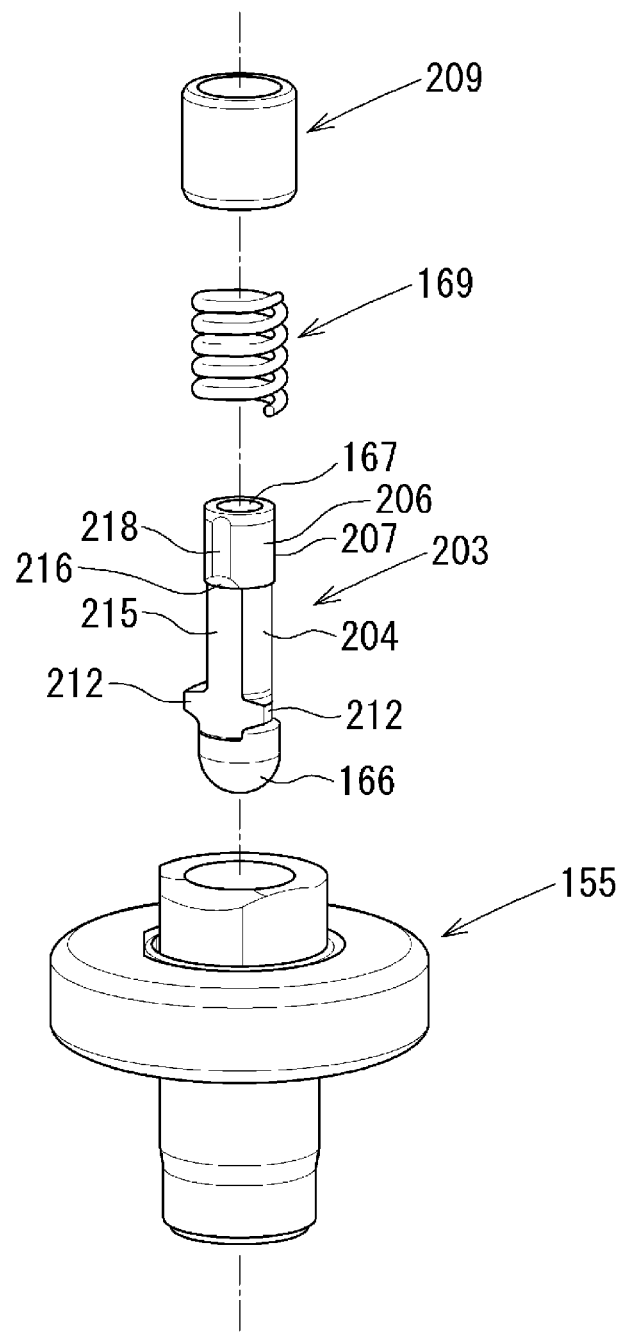
FIG. 20 is an exploded perspective view of the pilot orifice unit of the sixth embodiment.

On the poppet valve 165 side on an outer peripheral surface 204 of the spool 203, a plurality of protrusions 212 (one is illustrated in FIG. 19) that radially protrude is provided at equal intervals along the circumferential direction. The valve spring 169 (urging unit) that urges the valve body 166 of the poppet valve 165 in the valve closing direction ("downward" in FIG. 19) is interposed between the protrusion 212 and the bush 209. The valve opening pressure of the poppet valve 165 may be adjusted by the spring force of the valve spring 169. In the sixth embodiment, the press-fitting position of the bush 209 with respect to the pilot pin 155 is adjusted such that the spool valve 205 is opened after the poppet valve 165 is opened.

A cutout 215 is provided between the valve body 166 of the poppet valve 165 and the valve body 206 of the spool valve 205 on the outer peripheral surface 204 of the spool 203, in order to form a flow path 214 on the outer periphery of the poppet valve 165. The cutout 215 includes a plane parallel with the axis (center line) of the spool 203, and extends axially between the poppet valve 165 and the spool valve 205. A cutout 218 is provided on an upper end portion of the outer periphery surface 204 of the spool 203 in order to form a third orifice 217. The third orifice 217 always communicates the flow path 214 on the outer periphery of the poppet valve 165 and the introduction passage 171 with each other. The cutout 218 includes a plane parallel with the cutout 215, and is continuous with the cutout 215 via a tapered surface 216.

A width of the cutout 218 is smaller than a width of the cutout 215. Then, in the pilot orifice unit 202 in the sixth embodiment, pluralities (each one is illustrated in FIG. 19) of cutouts 215 and cutouts 218 are provided at equal intervals along the circumferential direction of the spool 203.

Figure 21:
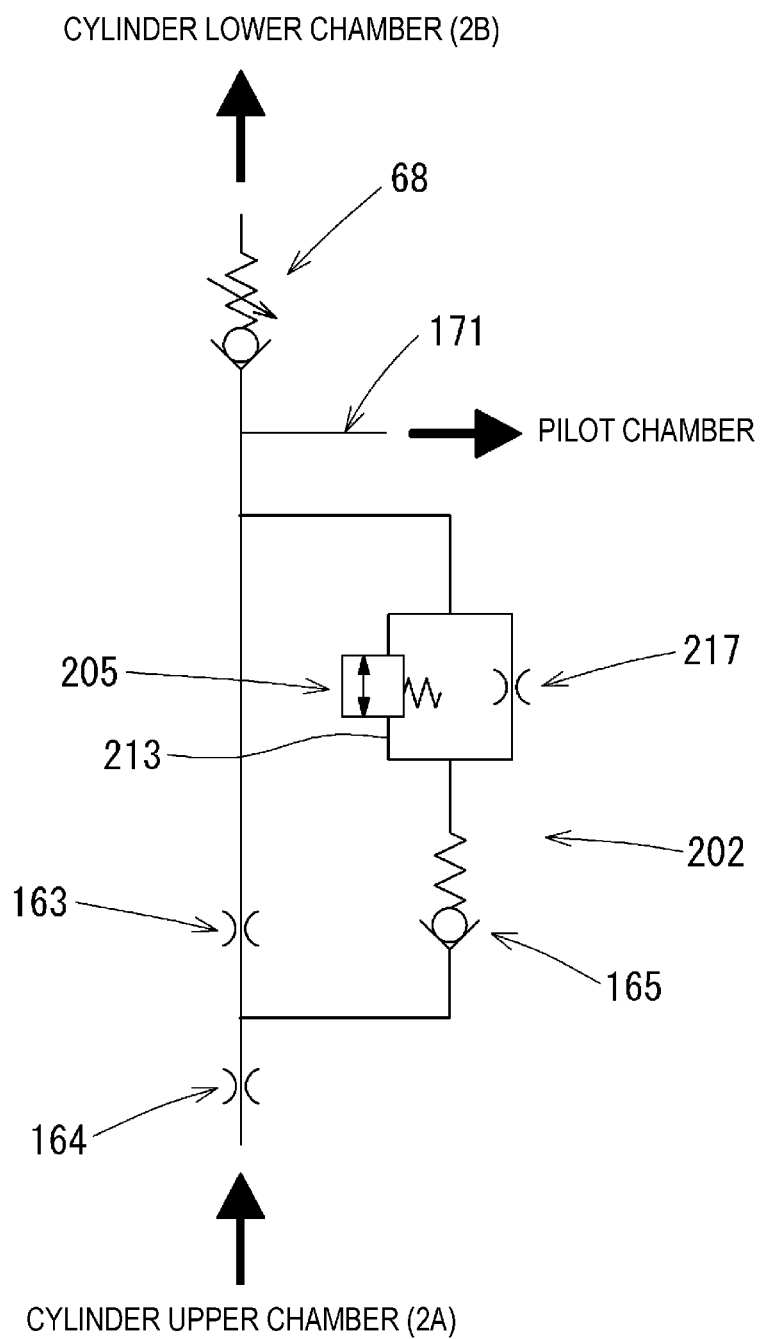
FIG. 21 is a conceptional view of the pilot orifice unit of the sixth embodiment.

Referring to FIG. 21, when the poppet valve 165 is closed, the cylinder upper chamber 2A is communicated with the pilot chamber 34 through the first orifice 163 provided on the inner periphery of the valve body 166. Then, when the poppet valve 165 is opened, the oil liquid passing through the second orifice 164 flows through the first orifice 163, and the third orifice 217 provided in parallel with respect to the first orifice 163. Further, after the poppet valve 165 is opened, when the pressure in the flow path 214 reaches the valve opening pressure of the spool valve 205 and the spool valve 205 is opened, a second passage 213 parallel with the third orifice 217 is opened.

Figure 22:
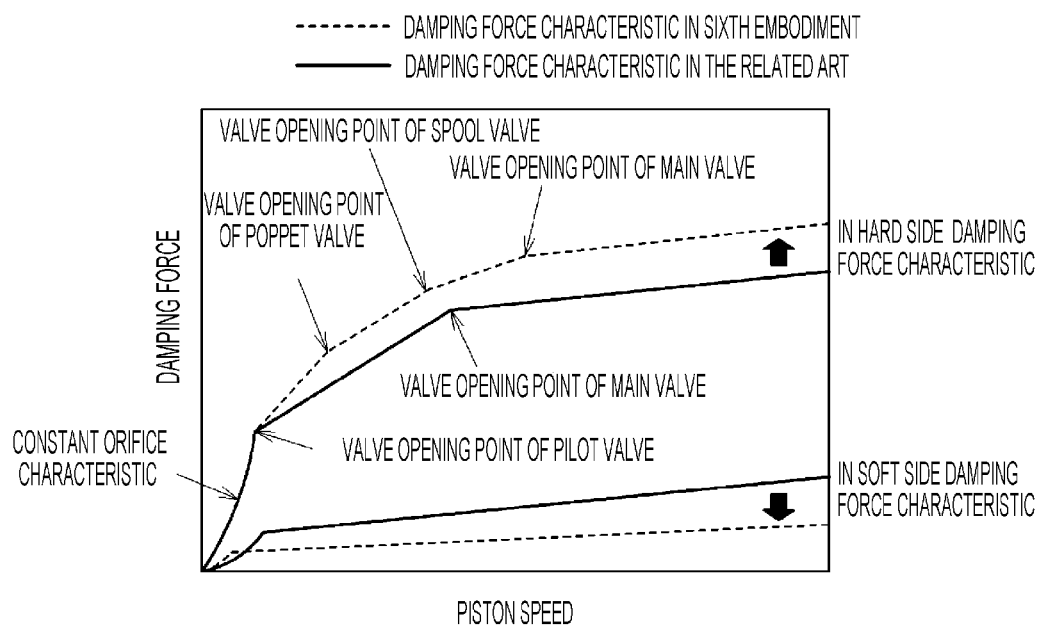
FIG. 22 is a graph comparing a damping force characteristic between a damping force generating mechanism provided with the pilot orifice unit according to the sixth embodiment and the damping force generating mechanism provided with the pilot orifice unit in the related art.

Referring to FIG. 22, before opening the pilot valve 68 (control valve) in the hard side damping force characteristic, the damping force generating mechanism 201 generates a damping force of a constant orifice characteristic by the fixed orifice 170 (see FIG. 19) provided in the main valve 32. When the piston speed is increased, the pilot valve 68 is opened, and the oil liquid is distributed to the first orifice 163, the damping force generating mechanism 201 generates a damping force of the orifice characteristic by the first orifice 163. When the piston speed is further increased, the valve body 166 is separated from the valve seat 168 against the urging force of the valve spring 169, and the poppet valve 165 is opened, before the spool valve 205 is opened, the oil liquid is distributed to the third orifice 217 provided in parallel with the spool valve 205. Therefore, the damping force generating mechanism 201 generates a damping force of the orifice characteristic by the third orifice 217.

When the piston speed is further increased, the valve body 206 is separated from the valve seat 208, and the spool valve 205 is opened, the second passage 213 is opened, and the flow path 214 is communicated with the introduction passage 171. Therefore, the damping force generating mechanism 201 generates a damping force of the orifice characteristic by the second orifice 164. When the piston speed is further increased so that the differential pressure between the cylinder upper chamber 2A and the pilot chamber 34 reaches the valve opening pressure (valve opening differential pressure) of the main valve 32, and the main valve 32 is opened, the damping force generating mechanism 201 generates a damping force of the valve characteristic by the main valve 32.

Here, in the fourth embodiment described above, there are three shift points of the damping force characteristic in the hard side damping force characteristic, that is, the valve opening point of the pilot valve 68 (control valve), the valve opening point of the poppet valve 165 (first check valve), and the valve opening point of the main valve 32. Meanwhile, in the sixth embodiment, the spool valve 205 is opened between the valve opening point of the poppet valve 165 and the valve opening point of the main valve 32 to switch the damping force characteristic, that is, the shift point of the damping force characteristic is increased to four points, and thus, the change in the inclination of the damping force characteristic may be reduced.

Further, in the sixth embodiment, since the pilot orifice unit 202 is configured by providing the spool valve body 205 (second check valve) on the outer periphery of the poppet valve 165 (first check valve), it is possible to vary the timing of the valve opening of the spool valve 205 after poppet valve 165 is opened depending on the press-fitting position of the bush 209 in which the valve seat 208 of the spool valve 205 is formed with respect to the shaft hole 156 of the pilot pin 155, and thus, it is possible to improve the degree of freedom in adjusting the damping force characteristic, which is necessary for reducing the valve vibration or jerk.

According to the sixth embodiment, the same operation effect as that of the first to fifth embodiments may be obtained.

Seventh Embodiment

Figure 23:
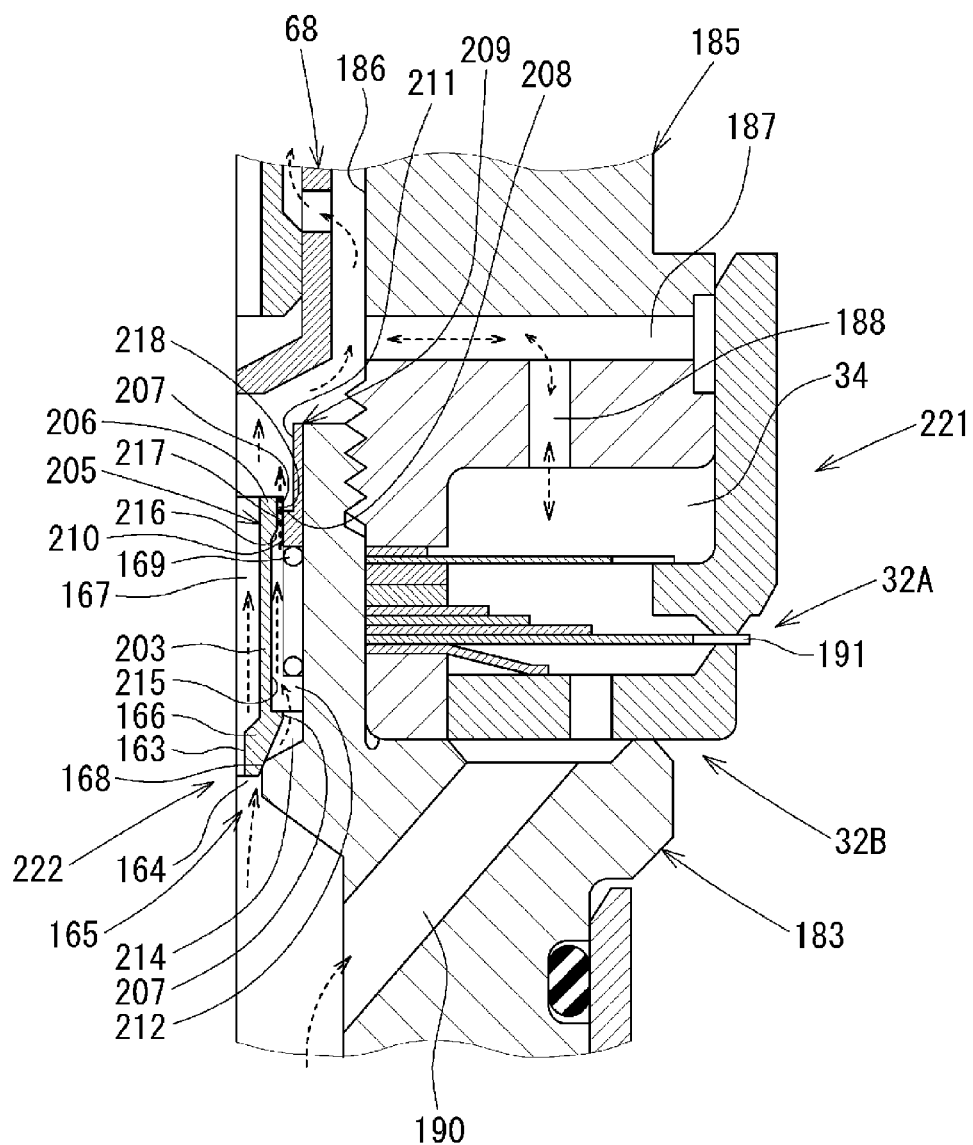
FIG. 23 is an explanatory view of a pilot orifice unit of a seventh embodiment.

Next, a seventh embodiment will be described with reference to FIGS. 23 and 24. The same or equivalent components as those in the embodiments described above will be assigned with the same names and reference numerals, and detailed description thereof will be omitted.

In the sixth embodiment described above, the pilot orifice unit 202 is configured by providing the spool valve body 205 (second check valve) on the outer periphery of the poppet valve 165 (first check valve). Meanwhile, in the seventh embodiment, a pilot orifice unit 222 is configured by applying the configuration according to the sixth embodiment to the pilot orifice unit 182 of the damping force generating mechanism 181 in the fifth embodiment in which the port 190 is gradually relieved.

Figure 24:
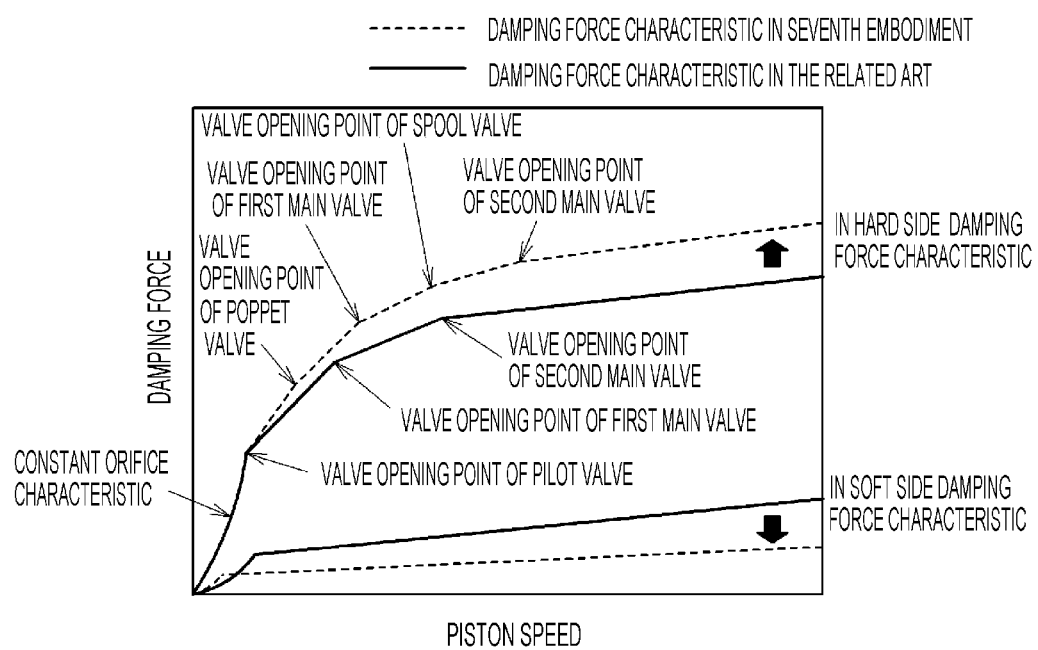
FIG. 24 is a graph comparing a damping force characteristic between a damping force generating mechanism provided with the pilot orifice unit according to the seventh embodiment and the damping force generating mechanism provided with the pilot orifice unit in the related art.

Referring to FIG. 24, before opening the pilot valve 68 (control valve) in the hard side damping force characteristic, the damping force generating mechanism 221 generates a damping force of a constant orifice characteristic by a fixed orifice 191 (see FIG. 23) provided in the first main valve 32A. When the piston speed is increased, the pilot valve 68 is opened, and the oil liquid is distributed to the first orifice 163, the damping force generating mechanism 221 generates a damping force of the orifice characteristic by the first orifice 163. When the piston speed is further increased, the valve body 166 is separated from the valve seat 168 against the urging force of the valve spring 169, and the poppet valve 165 is opened, before the spool valve 205 is opened, the oil liquid is distributed to the third orifice 217 provided in parallel with the spool valve 205. Therefore, the damping force generating mechanism 221 generates a damping force of the orifice characteristic by the third orifice 217.

When the piston speed is further increased so that the differential pressure between the cylinder upper chamber 2A and the pilot chamber 34 reaches the valve opening pressure (valve opening differential pressure) of the first main valve 32A, and the first main valve 32A is opened, the damping force generating mechanism 221 generates the damping force of the valve characteristic by the first main valve 32A. When the piston speed is further increased, the valve body 206 is separated from the valve seat 208, and the spool valve 205 is opened, the second passage 213 (see FIG. 21) is opened, and the flow path 214 is communicated with the introduction passage 171. Therefore, the damping force generating mechanism 221 generates a damping force of the orifice characteristic by the second orifice 164. When the piston speed is further increased so that the differential pressure between the cylinder upper chamber 2A and the pilot chamber 34 reaches the valve opening pressure (valve opening differential pressure) of a second main valve 32B, and the second main valve 32B is opened, the damping force generating mechanism 221 generates a damping force of the valve characteristic by the second main valve 32B.

Here, in the fifth embodiment, there are four shift points of the damping force characteristic in the hard side damping force characteristic, that is, the valve opening point of the pilot valve 68 (control valve), the valve opening point of the poppet valve 165 (first check valve), the valve opening point of the first main valve 32A, and the valve opening point of the second main valve 32B. Meanwhile, in the seventh embodiment, the spool valve 205 is opened between the valve opening point of the first main valve 32A and the valve opening point of the second main valve 32B to switch the damping force characteristic, and thus, the change in the inclination of the damping force characteristic may be further reduced. According to the seventh embodiment, it is possible to further smooth the shape of the change of the damping force characteristic, and by reducing the valve vibration or jerk, it is possible to further improve the sound vibration or the riding comfort of the vehicle.

According to the seventh embodiment, the same operation effect as that of the first to sixth embodiments may be obtained.

DESCRIPTION OF SYMBOLS

1: shock absorber
2: cylinder
5: piston valve (piston)
6: piston rod
27: introduction passage
32: main valve
34: pilot chamber
68: pilot valve (control valve)
117: check valve
131: first orifice
133: first passage
134: second orifice

What is claimed is:

1. A shock absorber comprising:
a cylinder filled with a fluid;
a piston slidably inserted into the cylinder;
a piston rod connected to the piston and extending outside the cylinder;
a main valve configured to control a flow of the fluid generated by sliding of the piston in the cylinder, thereby generating a damping force;
a pilot chamber configured to apply pressure to the main valve in a valve closing direction;
an introduction passage configured to introduce the fluid into the pilot chamber from an upper chamber of the cylinder;

a pilot passage configured to communicate the pilot chamber and a downstream side of the main valve with each other; and a control valve including a first valve body and a second valve body provided in the first valve body, wherein, in an upstream side of the pilot passage from the control valve, the pilot passage is provided with a first orifice that is in communication with a first passage provided in parallel with the first orifice and the first orifice is in communication with a second orifice through a first check valve that is opened at a predetermined differential pressure and allows a flow toward the control valve through the first passage.

2. The shock absorber according to claim 1, wherein the second orifice has a flow path area larger than a flow path area of the first orifice.

3. The shock absorber according to claim 1, wherein the first check valve is provided with the second orifice in series.

4. The shock absorber according to claim 1, wherein the first check valve is configured by stacking disc valves.

5. The shock absorber according to claim 1, wherein the first check valve is a poppet valve.

6. The shock absorber according to claim 1, wherein the main valve is gradually opened in accordance with pressure in the pilot chamber.

7. The shock absorber according to claim 1, wherein the second orifice is formed integrally with the first check valve.

8. The shock absorber according to claim 1, further comprising:
a third orifice provided between the first check valve and the control valve;
a second passage provided in parallel with the third orifice; and
a second check valve provided in the second passage.

9. The shock absorber according to claim 5, wherein the second check valve is provided in an outer periphery.

10. The shock absorber according to claim 9, wherein the second check valve is a spool valve.

11. The shock absorber according to claim 10, wherein the spool valve is provided with a valve spring, and the valve spring is adjusted to open the spool valve after the poppet valve is opened.

* * * * *